(12) United States Patent
Kobayashi et al.

(10) Patent No.: US 10,510,493 B2
(45) Date of Patent: Dec. 17, 2019

(54) CORE-SHELL COMPOSITE, METHOD FOR PRODUCING THE SAME, ELECTRODE MATERIAL, CATALYST, ELECTRODE, SECONDARY BATTERY, AND ELECTRIC DOUBLE-LAYER CAPACITOR

(71) Applicants: TPR CO., LTD., Chiyoda-ku, Tokyo (JP); NATIONAL INSTITUTE FOR MATERIALS SCIENCE, Tsukuba-shi, Ibaraki (JP)

(72) Inventors: Naoya Kobayashi, Nagano (JP); Yusuke Yamauchi, Tsukuba (JP); Rahul Salunkhe, Tsukuba (JP); Jing Tang, Tsukuba (JP)

(73) Assignees: TPR CO., LTD., Tokyo (JP); NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 16/074,878

(22) PCT Filed: Feb. 3, 2017

(86) PCT No.: PCT/JP2017/003978
§ 371 (c)(1),
(2) Date: Aug. 2, 2018

(87) PCT Pub. No.: WO2017/135405
PCT Pub. Date: Aug. 10, 2017

(65) Prior Publication Data
US 2019/0043675 A1    Feb. 7, 2019

(30) Foreign Application Priority Data
Feb. 4, 2016    (JP) .................................. 2016-020182

(51) Int. Cl.
*H01B 1/04*    (2006.01)
*H01G 11/24*    (2013.01)
(Continued)

(52) U.S. Cl.
CPC ............... *H01G 11/24* (2013.01); *H01B 1/04* (2013.01); *H01B 1/12* (2013.01); *H01G 11/36* (2013.01);
(Continued)

(58) Field of Classification Search
CPC ........ H01G 11/24; H01G 11/42; H01G 11/48; H01G 11/86; H01G 11/36; H01G 11/38;
(Continued)

(56) References Cited

U.S. PATENT DOCUMENTS

2008/0042110 A1    2/2008 Kamakura
2008/0139742 A1*   6/2008 Kamakura .............. C08L 79/02
                                                 524/609

(Continued)

FOREIGN PATENT DOCUMENTS

JP    10-297912    11/1998
JP    2004-137133    5/2004
(Continued)

OTHER PUBLICATIONS

Salunkhe, R. et al., "Ultrahigh performance supercapacitors utilizing core-shell nanoarchitectures from a metal-organic framework-derived nanoporous carbon and a conducting polymer", Chem. Sci., 2016, 7, 5704. (Year: 2016).*

(Continued)

*Primary Examiner* — Mark Kopec
*Assistant Examiner* — Jason P Thomas
(74) *Attorney, Agent, or Firm* — Nixon Peabody LLP; Jeffrey L. Costellia

(57) ABSTRACT

This core-shell composite (10) is provided with a core (11) formed from a porous carbon body having a large number of pores from the interior through to the surface, and a shell layer (12) formed from conductive polymer nanorods (12a) that extend outward from the cavities of the pores (11a) on (Continued)

the surface of the core. The present invention provides the core-shell composite (10), to which electrolyte ions can be efficiently adsorbed or doped, a method for producing the core-shell composite, as well as an electrode material, a catalyst, an electrode, a secondary battery and an electric double-layer capacitor that use the core-shell composite.

16 Claims, 4 Drawing Sheets

(51) Int. Cl.
| | | |
|---|---|---|
| *H01B 1/12* | (2006.01) | |
| *H01G 11/42* | (2013.01) | |
| *H01G 11/48* | (2013.01) | |
| *H01G 11/86* | (2013.01) | |
| *H01M 4/36* | (2006.01) | |
| *H01M 4/38* | (2006.01) | |
| *H01M 4/60* | (2006.01) | |
| *H01G 11/36* | (2013.01) | |
| *H01G 11/38* | (2013.01) | |

(52) U.S. Cl.
CPC .............. *H01G 11/42* (2013.01); *H01G 11/48* (2013.01); *H01G 11/86* (2013.01); *H01M 4/36* (2013.01); *H01M 4/38* (2013.01); *H01M 4/60* (2013.01); *H01G 11/38* (2013.01); *Y02E 60/13* (2013.01)

(58) Field of Classification Search
CPC . H01M 4/36; H01M 4/38; H01M 4/60; Y02E 60/13; H01B 1/04
See application file for complete search history.

(56) References Cited

U.S. PATENT DOCUMENTS

| | | | |
|---|---|---|---|
| 2013/0034803 A1 | 2/2013 | Adzic | |
| 2013/0202962 A1* | 8/2013 | Sakai | H01G 11/24 429/212 |
| 2014/0030594 A1* | 1/2014 | Sakai | H01G 11/32 429/213 |
| 2014/0220438 A1 | 8/2014 | Abe et al. | |
| 2014/0234711 A1 | 8/2014 | Rojeski | |
| 2015/0138694 A1 | 5/2015 | Shimomura et al. | |
| 2016/0225538 A1* | 8/2016 | Xie | C08G 73/0266 |

FOREIGN PATENT DOCUMENTS

| | | |
|---|---|---|
| JP | 2007-005724 | 1/2007 |
| JP | 2008-300639 A | 12/2008 |
| JP | 2011-046584 | 3/2011 |
| JP | 2012-033783 | 2/2012 |
| JP | 2013-538291 | 10/2013 |
| JP | 2013-232388 | 11/2013 |
| JP | 2015-090942 | 5/2015 |
| WO | WO-2012-012441 | 1/2012 |

OTHER PUBLICATIONS

Japanese Office Action dated Jan. 30, 2018 in JP App. No. 2017-531918.
International Search Report for PCT/JP2017/003978 dated Apr. 25, 2017.
European Office Action dated Aug. 14, 2019 in European Application No. 17747556.3.

* cited by examiner

CORE-SHELL COMPOSITE, METHOD FOR PRODUCING THE SAME, ELECTRODE MATERIAL, CATALYST, ELECTRODE, SECONDARY BATTERY, AND ELECTRIC DOUBLE-LAYER CAPACITOR

TECHNICAL FIELD

The present invention relates to a core-shell composite, a method for producing the same, an electrode material, a catalyst, an electrode, a secondary battery, and an electric double-layer capacitor.

Priority is claimed on Japanese Patent Application No. 2016-020182, filed Feb. 4, 2016, the content of which is incorporated herein by reference.

BACKGROUND ART

Electric double-layer capacitors and secondary batteries are known as conventional techniques for storing electrical energy (for example, see Patent Document 1). Electric double-layer capacitors are markedly superior to secondary batteries in terms of lifespan, safety and output density. However, electric double-layer capacitors suffer from low energy density (volumetric energy density) compared with secondary batteries.

Accordingly, in order to improve the energy density of electric double-layer capacitors, techniques have been proposed for increasing the electrostatic capacitance or the applied voltage of electric double-layer capacitors.

One known technique for increasing the electrostatic capacitance of an electric double-layer capacitor involves increasing the specific surface area of the activated carbon that constitutes the electrodes of electric double-layer capacitor. Currently known activated carbon has a specific surface area of 1,000 $m^2/g$ to 2,500 $m^2/g$. In an electric double-layer capacitor in which this type of activated carbon is used as the electrodes, an organic electrolyte obtained by dissolving a quaternary ammonium salt in an organic solvent or an aqueous solution electrolyte of sulfuric acid or the like is used as the electrolyte.

With an organic electrolyte, because the voltage range that can be used is broad, the applied voltage can be increased, enabling the energy density to be increased.

With an aqueous solution electrolyte, the electrolysis reaction of water becomes rate-limiting, and increasing the applied voltage is difficult. However, in the case of an aqueous solution electrolyte, the adsorbed and desorbed ions are hydrogen ions and hydroxide ions, which are smaller than the cations and anions in the case of an organic electrolyte. Accordingly, with an aqueous solution electrolyte, the electrostatic capacitance can be increased compared with an organic electrolyte.

Further, redox capacitors that use ruthenium oxide or the like as an electrode material and utilize the pseudo-capacitance of the ruthenium oxide are also known. Redox capacitors offer the advantage of having a large electrostatic capacitance compared with electric double-layer capacitors that use activated carbon. However, redox capacitors have a problem in that, compared with electric double-layer capacitors using activated carbon or the like, the stability of the charge-discharge cycle is low, and another problem in that the electrode material such as ruthenium oxide is an expensive and rare resource, meaning industrial application is difficult.

Furthermore, pseudo electric double-layer capacitors that use conductive polymers are also known.

One known technique for increasing the applied voltage of an electric double-layer capacitor is a lithium ion capacitor that utilizes the principles of an electric double-layer capacitor. Lithium ion capacitors are also known as hybrid capacitors. In a lithium ion capacitor, one of the electrodes that constitutes an electric double-layer capacitor is replaced with graphite or hard carbon or the like that acts as the anode material of a lithium ion secondary battery, and lithium ions are inserted into the graphite or hard carbon. Lithium ion capacitors have the advantage that the applied voltage is larger than that for a typical electric double-layer capacitor, namely a capacitor in which both electrodes are composed of activated carbon. However, when graphite is used for an electrode, a problem arises in that propylene carbonate cannot be used as the electrolyte. When graphite is used for an electrode, propylene carbonate undergoes electrolysis, and decomposition products of the propylene carbonate adhere to the surface of the graphite, causing a deterioration in the lithium ion reversibility. Propylene carbonate is a solvent that can operate even at low temperatures. When propylene carbonate is used in an electric double-layer capacitor, the resulting electric double-layer capacitor can be used even at −40° C. Accordingly, in a lithium ion capacitor, a hard carbon that is unlikely to cause electrolysis of propylene carbonate is used as the electrode. However, compared with graphite, hard carbon has a low capacitance per unit volume of the electrode, and the voltage is also lower than that obtained with graphite (and adopts a noble potential). As a result, problems arise, including a lowering of the energy density of the lithium ion capacitor.

PRIOR ART LITERATURE

Patent Document

Patent Document 1: Japanese Unexamined Patent Application, First Publication No. 2011-046584

DISCLOSURE OF INVENTION

Problems to be Solved by the Invention

In those cases where electrodes composed of activated carbon are used in an electric double-layer capacitor, there is a problem in that the relationship between the specific surface area of the activated carbon and the electrostatic capacitance is not a proportional relationship. Further, as the specific surface area is enlarged, the density of the material itself decreases, resulting in a decrease in the electrostatic capacitance per unit volume of the electrode.

The reason that the relationship between the specific surface area of the activated carbon and the electrostatic capacitance is not a proportional relationship is that when activated carbon is used, and particularly in those cases where an organic electrolyte is used, the proportion of pores having a pore size smaller than the electrolyte ions contained in the organic electrolyte is large, meaning the adsorption of electrolyte ions to 70% to 90% of the pores is difficult. Accordingly, increasing the electrostatic capacitance of an electric double-layer capacitor simply by enlarging the specific surface area of the activated carbon is difficult.

Further, conventional methods for producing activated carbon have a problem in that controlling the pore size of the activated carbon is difficult. In other words, with conventional methods for producing activated carbon, producing activated carbon that has pores capable of efficiently adsorbing the electrolyte ions is difficult.

Furthermore, if the activation treatment is progressed in order to enlarge the specific surface area of the activated carbon, then the proportion of small pores in the activated carbon tends to increase. This type of increase in the proportion of small pores not only hinders any contribution to an increase in the electrostatic capacitance, but also reduces the density of the activated carbon particles, resulting in a decrease in the electrostatic capacitance per unit volume of the electrode.

The present invention has been developed in light of the above circumstances, and has objects of providing a core-shell composite to which electrolyte ions can be efficiently adsorbed or doped, a method for producing the core-shell composite, as well as an electrode material, a catalyst, an electrode, a secondary battery and an electric double-layer capacitor that use the core-shell composite.

Means for Solving the Problems

In order to achieve the above objects, the inventors of the present invention devise a core-shell composite containing a core formed from a carbon porous body having a large number of pores from the interior through to the surface, and a shell layer formed from conductive polymer nanorods that extend outward from the cavities of pores on the surface of the core. More specifically, the inventors have conducted intensive research of core-shell structures having a core formed from a carbon porous body covered with a shell having the function of increasing the specific surface area, to ascertain whether an electrode material having a higher specific surface area than conventional materials could be obtained. A core-shell structure typically describes a structure in which a core is covered with a thin film (shell). Covering the core with a thin film tends to restrict the utilization of the surface and pores of the core formed from the carbon porous body, meaning there is a possibility that increasing the specific surface area with a typical core-shell structure is difficult. As a result of intensive research, the inventors of the present invention have succeeded in producing a core-shell structure of a type not yet seen, in which whisker-like (substantially conical) conductive polymer rods extend from bases within the pores of a carbon porous body, and have discovered that this new type of core-shell structure have had a higher specific surface area than conventional materials, enabling them to complete the present invention.

The core-shell composite of the present invention is composed of a carbon porous body and conductive polymer nanorods, wherein electrolyte ions adsorb to the carbon porous body and dope the conductive polymer nanorods. Although academically the reaction mechanisms are different, they may be considered the same in terms of both yielding electrostatic capacitance. In this description, the expressions adsorption and doping are used to appropriately distinguish the two mechanisms.

The present invention provides the following aspects.

[1] A core-shell composite containing a core formed from a carbon porous body having a large number of pores from the interior through to the surface, and a shell layer formed from conductive conductive-polymer nanorods that extend outward from the cavities of pores the surface of the core.

[2] The core-shell composite according to [1], wherein adjacent conductive polymer nanorods extend independently.

[3] The core-shell composite according to [1], wherein the length that the conductive polymer nanorods extend from the pores is at least 1 nm but not more than 100 nm.

[4] The core-shell composite according to any one of [1] to [3], wherein the carbon porous body is a nanoporous carbon, and the average pore size of the pores of the nanoporous carbon, obtained by a pore distribution analysis performed using non-localized density functional theory, is at least 1.0 nm but not more than 3.0 nm.

[5] The core-shell composite according to [4], wherein the specific surface area of the nanoporous carbon obtained by the nitrogen BET method is 1,000 $m^2$/g or more.

[6] The core-shell composite according to [4] or [5], wherein the nanoporous carbon has, within a pore distribution curve determined from a nitrogen adsorption isotherm using non-localized density functional theory, a peak within the range of pore sizes from at least 0.4 nm to not more than 4.2 nm, and the full width at half maximum centered on that peak is at least 0.5 nm but not more than 1.2 nm.

[7] The core-shell composite according to any one of [1] to [6], wherein the carbon porous body has a polyhedral structure having a crystal structure.

[8] The core-shell composite according to any one of [1] to [7], wherein the conductive polymer nanorods are substantially conical.

[9] The core-shell composite according to any one of [1] to [8], wherein the conductive polymer is at least one type of compound selected from the group consisting of aliphatic conjugated system compounds, aromatic conjugated system compounds, heterocyclic conjugated system compounds, hetero atom-containing conjugated system compounds, double-stranded conjugated system compounds and mixed-type conjugated system compounds.

[10] An electrode material containing the core-shell composite according to any one of [1] to [9].

[11] A catalyst containing the core-shell composite according to any one of [1] to [9].

[12] An electrode containing the electrode material according to [10].

[13] A secondary battery containing the electrode according to [12].

[14] An electric double-layer capacitor containing the electrode according to [12].

[15] A method for producing a core-shell composite, the method having a shell layer formation step of adding a carbon porous body to a mixed solution formed from an alcohol solution containing a strong acid and a conductive polymer or a monomer thereof, and a solution containing a strong acid and ammonium persulfate, thereby forming a shell layer formed from the conductive polymer or the monomer thereof on the surface of the carbon porous body.

[16] The method for producing a core-shell composite according to [15], wherein the conductive polymer or the monomer thereof is at least one type of compound selected from the group consisting of aliphatic conjugated system compounds, aromatic conjugated system compounds, heterocyclic conjugated system compounds, hetero atom-containing conjugated system compounds, double-stranded conjugated system compounds and mixed-type conjugated system compounds.

Effects of the Invention

The present invention is able to provide a core-shell composite to which electrolyte ions can be efficiently adsorbed or doped, a method for producing the core-shell composite, as well as an electrode material, a catalyst, an electrode, a secondary battery and an electric double-layer capacitor that use the core-shell composite.

EMBODIMENTS FOR CARRYING OUT THE INVENTION

Embodiments of the core-shell composite of the present invention, the method for producing the core-shell composite, and the electrode material, catalyst, electrode, secondary battery and electric double-layer capacitor that use the core-shell composite are described below.

These embodiments are described in detail to facilitate comprehension of the effects of the present invention, but unless particularly specified otherwise, in no way limit the scope of the present invention.

[Core-Shell Composite]

Figure 1:
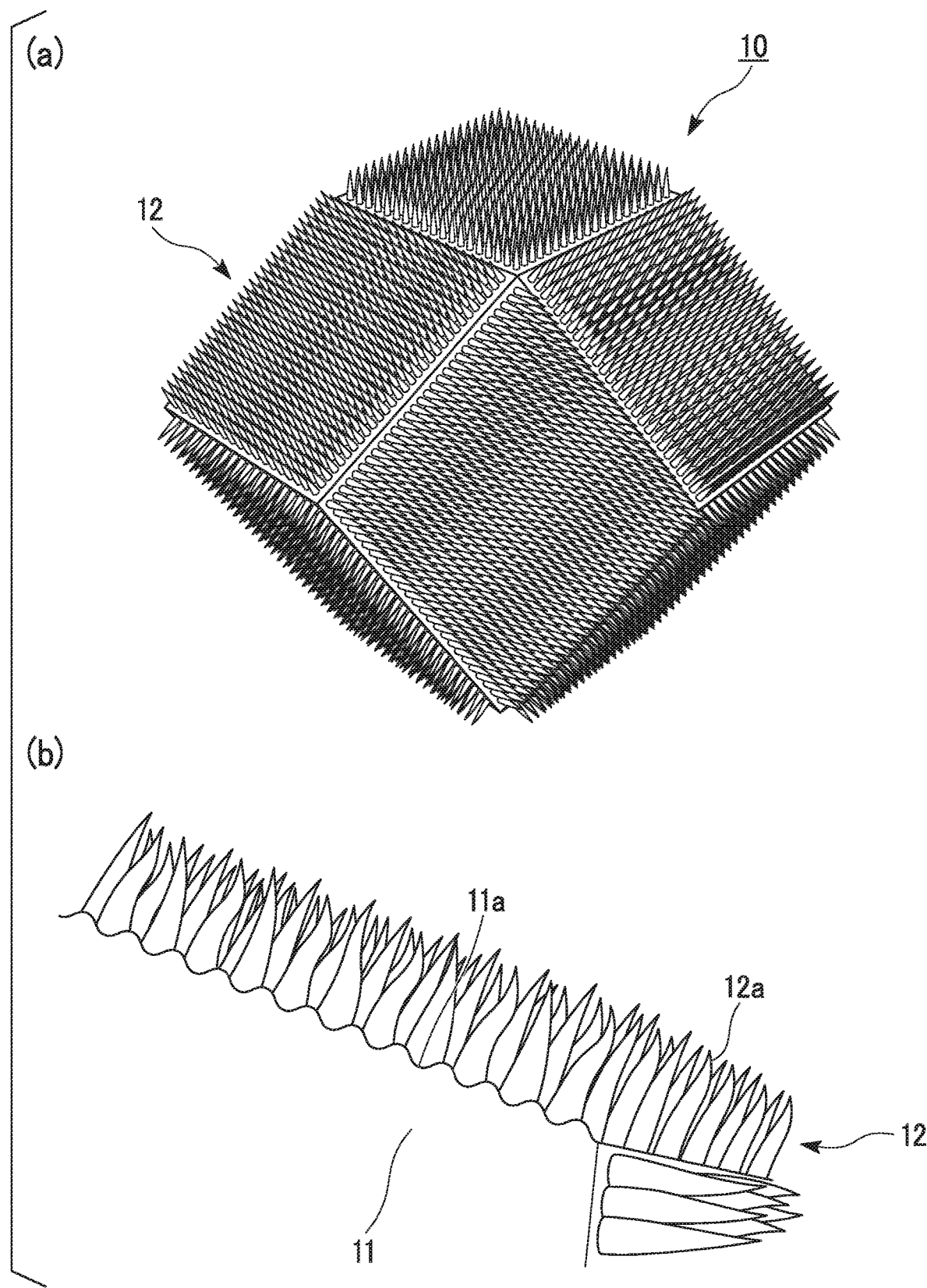
FIG. 1 is a diagram illustrating the basic structure of one embodiment of the core-shell composite of the present invention, wherein (a) is a perspective view and (b) is a cross-sectional view.

FIG. 1 is a diagram illustrating the basic structure of one embodiment of the core-shell composite of the present invention, wherein (a) is a perspective view and (b) is a cross-sectional view.

As illustrated in FIGS. 1(a) and (b), the core-shell composite 10 of this embodiment includes a core 11 formed from a carbon porous body having a large number of pores from the interior through to the surface, and a shell layer 12 formed from conductive polymer nanorods 12a that extend outward from the cavities of pores 11a on the surface of the core 11.

The expression "large number of pores" means that the carbon porous body has a sufficient number of pores to enable use, as a standalone substance, for the electrode material of an electric double-layer capacitor, and although not a particular limitation, means the carbon porous body has a sufficient number of pores to yield a specific surface area, for example determined by the nitrogen BET method (a BET method using nitrogen (Brunauer-Emmett-Teller method: a method for determining the specific surface area (surface area per unit of weight) from analysis of the adsorption isotherm)), that is at least 500 m²/g.

FIG. 1 is a schematic illustration that has been drawn based on SEM images and TEM images of a core-shell composite containing a core formed from a nanoporous carbon produced by a method described below using ZIF-8 as the metal-organic framework of the starting material, and a shell layer formed from polyaniline nanorods that extend outward from the pores on the surface of the core.

In the core-shell composite example illustrated in FIG. 1(b), the carbon porous body that constitutes the core 11 has a polyhedral structure having a crystal structure, and the shell layer 12 is formed from the conductive polymer nanorods 12a, which extend outward from bases within the pores 11a on the surface of the core 11 formed from the carbon porous body and have a substantially conical shape that narrows with increasing distance from the pores 11a.

There are no particular limitations on the carbon porous body that constitutes the core 11, provided the body has nano-order pores 11a, and examples include porous carbon materials such as mesoporous carbon with a pore size of at least 2 nm but not more than about 50 nm and nanoporous carbon with a pore size of at least 1.0 nm but not more than about 3.0 nm, and activated carbons and the like.

The carbon porous body is preferably a nanoporous carbon, and the average pore size of this nanoporous carbon, obtained by pore distribution analysis performed using non-localized density functional theory, is preferably at least 1.0 nm but not more than 3.0 nm, and more preferably at least 1.3 nm but not more than 2.4 nm.

Provided the average pore size of the nanoporous carbon is within the above range, the shell layer 12 formed from the conductive polymer nanorods 12a that are formed inside these nanoporous carbon pores (the pores 11a of the core 11) can be doped with a greater number of electrolyte ions. Accordingly, in those cases where the core-shell composite 10 is used for an electrode material, and that electrode material is used as the electrode of an electric double-layer capacitor, the electrostatic capacitance of the electric double-layer capacitor can be increased.

The average pore size of the nanoporous carbon in this embodiment can be measured at the same time as the nanoporous carbon pore distribution curved described below.

In this embodiment, the specific surface area of the nanoporous carbon obtained using the nitrogen BET method is preferably 1,000 m²/g or more, more preferably 1,300 m²/g or more, and even more preferably at least 1,500 m²/g but not more than 2,500 m²/g.

Provided the specific surface area of the nanoporous carbon is within the above range, the shell layer 12 formed from the conductive polymer nanorods 12a that are formed inside these nanoporous carbon pores (the pores 11a of the core 11) can be doped with a greater number of electrolyte ions. Accordingly, in those cases where the core-shell composite 10 is used for an electrode material, and that electrode material is used as the electrode of an electric double-layer capacitor, the electrostatic capacitance of the electric double-layer capacitor can be increased.

It is preferable that the nanoporous carbon has, within the pore distribution curve determined from the nitrogen adsorption isotherm using non-localized density functional theory, a peak within the range of pore sizes from at least 0.4 nm to not more than 4.2 nm, and the full width at half maximum centered on that peak is preferably at least 0.5 nm but not more than 1.2 nm. Further, it is more preferable that the nanoporous carbon has a peak in the above pore distribution curve within the range of pore sizes from at least 1.3 nm to not more than 2.4 nm, and the full width at half maximum centered on that peak is more preferably at least 0.5 nm but not more than 0.8 nm.

By ensuring that the nanoporous carbon has a peak in the above pore distribution curve within the range of pore sizes from at least 0.4 nm to not more than 4.2 nm, and that the full width at half maximum centered on that peak is at least 0.5 nm but not more than 1.2 nm, the shell layer 12 formed from the conductive polymer nanorods 12a that are formed inside these nanoporous carbon pores (the pores 11a of the core 11) can be doped with a greater number of electrolyte ions. Accordingly, in those cases where the core-shell composite 10 is used for an electrode material, and that electrode material is used as the electrode of an electric double-layer capacitor, the electrostatic capacitance of the electric double-layer capacitor can be increased.

In this embodiment, the method used for determining the nanoporous carbon pore distribution curve from the nitrogen adsorption isotherm using non-localized density functional theory is a method that has been developed recently as a new evaluation method. By using this new method, materials that have conventionally been analyzed separately for mesopores and micropores can be evaluated using a single theory to obtain a full-range pore distribution (for reference, see http://www.microtrac-bel.com/tech/bel/seminar15.html (as at Jan. 21, 2016).

One example of the apparatus used for determining the nanoporous carbon pore distribution curve from the nitrogen adsorption isotherm using non-localized density functional theory is the specific surface area/pore distribution analyzer (product name: ASAP-2020) manufactured by Shimadzu Corporation.

As described below, the nanoporous carbon is preferably obtained using a metal-organic framework (MOF) as the starting material, by firing this metal-organic framework, and then using hydrofluoric acid or the like to remove the metal contained in the fired product. The nanoporous carbon obtained in this manner has the type of substantially uniform pore size described above. Further, by selecting the type of metal contained in the metal-organic framework of the starting material, a nanoporous carbon having the desired pore size can be obtained.

Examples of the metal-organic framework include ZIF-8, MIL-101, MOF-5, IRMOF-1, ZIF-67 and MOF-177, and other frameworks.

Figure 2:
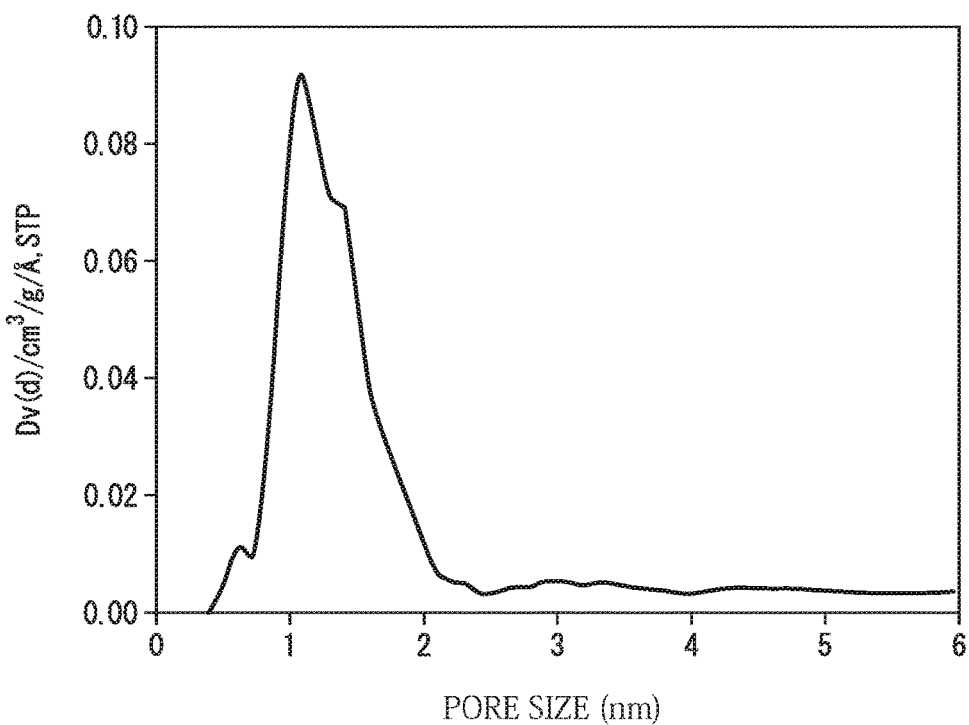
FIG. 2 is a diagram illustrating the pore distribution curve for a nanoporous carbon determined from a nitrogen adsorption isotherm using non-localized density functional theory in the core-shell composite of the present invention.

FIG. 2 illustrates one example of a pore distribution curve determined from a nitrogen adsorption isotherm using non-localized density functional theory, and shows the pore distribution curve for a nanoporous carbon produced using ZIF-8 as the metal-organic framework of the starting material.

In the core-shell composite 10 of the present embodiment, it is preferable that adjacent conductive polymer nanorods 12a, which are formed inside the pores of the nanoporous carbon (the pores 11a of the core 11) and constitute the shell layer 12, are not intertwined. In other words, adjacent conductive polymer nanorods 12a preferably extend independently.

As illustrated schematically in FIG. 1, the shell layer 12 is formed from the conductive polymer nanorods 12a, which extend outward from bases within the pores 11a on the surface of the core 11 formed from the carbon porous body, and have a substantially conical shape that narrows with increasing distance from the pores 11a. Accordingly, adjacent conductive polymer nanorods 12a are not intertwined. In this manner, by ensuring that adjacent conductive polymer nanorods 12a adopt an arrangement that is not intertwined, the shell layer 12 formed from the conductive polymer nanorods 12a can be doped with a greater number of electrolyte ions. Further, in a structure in which adjacent conductive polymer nanorods 12a are not intertwined, the conductive polymer nanorods 12a do not cover the surface of the nanoporous carbon, or the surface area covered is extremely small, and therefore any reduction in the amount of electrolyte ions that can adsorb to the surface compared with the case of the stand-alone nanoporous carbon is either non-existent or extremely small.

Although there are no particular limitations on the meaning of the description that the surface area of the nanoporous carbon covered by the conductive polymer nanorods 12a is extremely small, the surface area of the nanoporous carbon covered by the conductive polymer nanorods 12a is preferably from 1% to 10%.

Further, the length along which the conductive polymer nanorods 12a that constitute the shell layer 12 extend from the pores 11a on the surface of the core 11 is preferably at least 1 nm but not more than 100 nm, and more preferably at least 10 nm but not more than 30 nm. The length which the conductive polymer nanorods 12a extend from the pores can be controlled by the growth time for the conductive polymer nanorods 12a.

If the length along which the conductive polymer nanorods 12a that constitute the shell layer 12 extend from the pores 11a on the surface of the core 11 is less than 1 nm, then the effect of the shell layer 12 formed from the conductive polymer nanorods 12a in increasing the amount of electrolyte ion doping is small. In contrast, if the length along which the conductive polymer nanorods 12a that constitute the shell layer 12 extend from the pores 11a on the surface of the core 11 exceeds 100 nm, then adjacent conductive polymer nanorods 12a can sometimes become intertwined.

The conductive polymer that represents the material of the conductive polymer nanorods 12a that constitutes the shell layer 12 is preferably at least one type of compound selected from the group consisting of aliphatic conjugated system compounds, aromatic conjugated system compounds, heterocyclic conjugated system compounds, hetero atom-containing conjugated system compounds, double-stranded conjugated system compounds and mixed-type conjugated system compounds. In other words, one of these compounds may be used alone, or a combination of two or more compounds may be used.

Examples of the aliphatic conjugated system compounds include polyacetylene and the like. Examples of the aromatic conjugated system compounds include poly(p-phenylene) and the like. Examples of the heterocyclic conjugated system compounds include polypyrrole and polythiophene and the like. Examples of the hetero atom-containing conjugated system compounds include polyaniline and the like. Examples of the double-stranded conjugated system compounds include polyacene and the like. Examples of the mixed-type conjugated system compounds include poly(p-phenylenevinylene) and the like. An example of a mixture of these compounds that may be used is polythiophene-polystyrene sultanate (PEDOT/PSS).

Because the core-shell composite 10 of the present embodiment contains the core 11 formed from a carbon porous body, and the shell layer 12 formed from the conductive polymer nanorods 12a that extend outward from the pores 11a on the surface of the core 11, the shell layer 12 composed of the conductive polymer nanorods 12a that are formed inside the pores 11a of the core 11 (or formed with the pores acting as the bases of the nanorods) can be doped with a greater number of electrolyte ions. Accordingly, in those cases where the core-shell composite 10 is used for an electrode material, and that electrode material is used as the electrode of an electric double-layer capacitor, the electrostatic capacitance of the electric double-layer capacitor can be increased.

Particularly in those cases where the nanoporous carbon described above is used as the carbon porous body, the following types of effects are obtained.

When the nanoporous carbon described above is used as the carbon porous body, the shell layer 12 that extends outward from the pores of the nanoporous carbon (the pores 11a of the core 11) is formed from the conductive polymer nanorods 12a that grow using the pores 11a of uniform pore size as nucleation sites, and therefore compared with the case where pores that can act as nucleation sites do not exist, the shell layer 12 is formed from conductive polymer nanorods 12a that have a more uniform size (diameter and length) and shape.

By selecting a nanoporous carbon having a pore size and density that fall within prescribed ranges as the carbon porous body, a shell layer 12 formed from conductive polymer nanorods 12a having more uniform size (diameter and length) and shape can be formed.

Further, because the conductive polymer nanorods 12a that form the shell layer 12 grow using the pores of the carbon porous body (the core 11) as nucleation sites, they cannot move about freely on the surfaces of the carbon porous body (the core 11), and are unlikely to aggregate (meaning aggregation is suppressed). In other words, the shell layer 12 can be formed without adjacent conductive polymer nanorods 12a intertwining. In those cases where the conductive polymer nanorods 12a do not undergo aggregation, the surface area of the shell layer 12 increases compared with the case where the conductive polymer nanorods 12a do aggregate, meaning the shell layer 12 can be doped with a greater number of electrolyte ions contained in the organic electrolyte.

The description above focuses mainly on electrode material applications for electric double-layer capacitors, but the core-shell composite of the present embodiment can be used as a replacement for various members that have conventionally used carbon materials, and can therefore be used widely as an electrode material for all manner of other electric charge storage devices, or in catalysts, displays such as organic EL displays, organic transistors, and printable circuits and the like.

[Method for Producing Core-Shell Composite]

The method for producing a core-shell composite according to one embodiment of the present invention has a shell layer formation step of adding a carbon porous body to a mixed solution formed from an alcohol solution containing a strong acid and a conductive polymer or a monomer thereof, and a solution containing a strong acid and ammonium persulfate, thereby forming a shell layer formed from the conductive polymer or the monomer thereof on the surface of the carbon porous body.

More specifically, the method for producing a core-shell composite according to this embodiment has a first solution preparation step of preparing a first solution containing a conductive polymer or a monomer thereof by dissolving the conductive polymer or monomer thereof in an alcohol solution containing a strong acid and an alcohol, a second solution preparation step of preparing a second solution containing ammonium persulfate by dissolving the ammonium persulfate in a strong acid, and a shell layer formation step of adding a carbon porous body to a mixed solution containing the first solution and the second solution, thereby forming a shell layer formed from the conductive polymer or monomer thereof on the surface of the carbon porous body.

The alcohol solution used in the first solution preparation step (hereafter referred to as "the step A") is prepared by adding the alcohol to a strong acid and mixing the components.

Examples of strong acids that may be used include perchloric acid ($HClO_4$), sulfuric acid ($H_2SO_4$), hydrochloric acid (HCl), and other acids. Among these, perchloric acid is preferred from the viewpoint of reproducibility.

Examples of alcohols that may be used include methanol, ethanol, and butanol and the like. Among these, ethanol is preferred from the viewpoint of reproducibility.

In the step A, the mixing ratio between the strong acid and the alcohol is preferably a volumetric ratio within a range from 10:1 to 1:1.

By adding the conductive polymer described above or a monomer thereof to this type of alcohol solution, and mixing the components to dissolve the conductive polymer or monomer thereof in the alcohol solution, the first solution containing the conductive polymer or monomer thereof can be prepared.

A conductive polymer described above is preferably used as the conductive polymer.

A monomer for one of the conductive polymers described above is preferably used as the monomer of the conductive polymer.

In other words, the monomer of the conductive polymer is preferably at least one compound selected from the group consisting of aliphatic conjugated system compounds, aromatic conjugated system compounds, heterocyclic conjugated system compounds, hetero atom-containing conjugated system compounds, double-stranded conjugated system compounds and mixed-type conjugated system compounds.

One of these compounds may be used alone, or a combination of two or more compounds may be used.

Examples of the aliphatic conjugated system compounds include acetylene and the like. Examples of the aromatic conjugated system compounds include p-phenylene and the like. Examples of the heterocyclic conjugated system compounds include pyrrole and thiophene. Examples of the hetero atom-containing conjugated system compounds include aniline and the like. Examples of the double-stranded conjugated system compounds include acenes and the like. Examples of the mixed-type conjugated system compounds include p-phenylenevinylene and the like.

In the step A, the mixing ratio between the above alcohol solution and the conductive polymer or onomer thereof is preferably a weight ratio within a range from 50:1 to 50:10.

The temperature during the mixing of the alcohol solution and the conductive polymer or onomer thereof is preferably at least $-20°$ C. but not more than $0°$ C. in order to ensure that the conductive polymer or monomer thereof does not polymerize.

Further, the time for which the alcohol solution and the conductive polymer or monomer thereof are mixed is preferably at least 5 minutes but not more than 30 minutes.

Examples of the strong acid used in the second solution preparation step (hereafter referred to as "the step B") include the same strong acids as those described above for use in the step A.

In the step B, the mixing ratio between the strong acid and the ammonium persulfate ($(NH_4)_2S_2O_8$) is preferably a weight ratio within a range from 500:1 to 500:50.

In the polymerization step (hereafter referred to as "the step C"), the mixing ratio between the first solution and the second solution is preferably a volumetric ratio within a range from 5:1 to 5:10.

In the step C, the mixing ratio between the mixed solution of the first solution and the second solution and the carbon porous body is preferably a weight ratio within a range from 1:10 to 1:2000.

In the step C, by stirring the mixed solution described above and the carbon porous body, and adhering the conductive polymer to the surface of the carbon porous body, a shell layer formed from conductive polymer nanorods that extend outward from the pores of the carbon porous body can be formed. Further, in the step C, by stirring the mixed solution described above and the carbon porous body, and polymerizing the monomer of the conductive polymer, conductive polymer nanorods can be grown within the pores of the carbon porous body core functioning as nucleation sites, thus forming a shell layer formed from conductive polymer nanorods that extend outward from the pores of the carbon porous body.

In the step C, the temperature during polymerization of the monomer of the conductive polymer is preferably at least −20° C. but not more than 0° C.

Further, in the step C, the time for which the monomer of the conductive polymer is polymerized is preferably at least 1 hour but not more than 10 hours. By adjusting the time for which the monomer of the conductive polymer is polymerized, namely the time for which the conductive polymer nanorods are grown, the length of the conductive polymer nanorods can be controlled.

By performing the steps described above, the core-shell composite 10 of the embodiment described above can be obtained.

The obtained core-shell composite 10 is preferably washed with distilled water to remove the aforementioned strong acid, alcohol, ammonium persulfate, and unreacted monomer and the like.

A nanoporous carbon described above is preferably used as the carbon porous body. This nanoporous carbon is produced in the manner described below.

[Method for Producing Nanoporous Carbon]

The method for producing a nanoporous carbon has a carbonization step of subjecting a metal-organic framework having a metal ion and an organic ligand linked together to a heat treatment, thereby carbonizing the organic ligand, and a metal removal step of removing the metal from the carbonized framework.

A commercially available product may be used as the metal-organic framework, or a product produced using the production ethod described below may be used.

In order to produce the metal-organic framework, an alcohol solution containing a second heterocyclic aromatic compound is added to an aqueous solution containing a metal acetate and a first heterocyclic aromatic compound, and the two solutions are stirred and mixed.

In this method for producing the metal-organic framework, first a solution containing a metal salt and an organic linker is prepared.

Although there are no particular limitations on the metal salt, examples include organic acid salts such as acetates, as well as nitrates, chlorides and sulfates. Among these, from the viewpoints of quality and performance, an acetate is preferred. One of these metal acetates may be used alone, or a combination of two or more salts may be used. Examples of the metal ion include ions of aluminum, copper, iron, zinc and magnesium. The type of metal ion is selected with due consideration of the desired pore size and the like. Further, in the firing step used for performing carbonization, zinc, which undergoes metal vaporization readily at low temperatures, is particularly desirable from the aspect of the following. As the firing temperature is increased, the pores tend to be prone to shrinkage, and the specific surface area also tends to decrease, but in those cases where zinc is used, because sublimation occurs at low temperatures, the carbonization temperature can be kept low, and a high specific surface area can be more easily maintained.

Polyvinylpyrrolidone or the like may be used as an additive for achieving more uniform dispersion.

Examples of the solvent include ethanol, water, methanol, N,N-dimethylformamide (DMF), N,N-diethylformamide (DEF), dimethyl sulfoxide (DMSO), and the like. Among these, ethanol is preferred from the viewpoints of cost and quality assurance.

Examples of the organic linker include 2-methylimidazole ($C_4H_6N_2$), 5-cyano-1,3-benzenedicarboxylic acid ($C_9H_5NO_4$), 5-ethyl-1,3-benzenedicarboxylic acid ($C_{10}H_6O_4$), [1,1':4',1'']tetraphenyl-3,3'',5,5''-tetracarboxylic acid ($C_{22}H_{14}O_8$), 1,3,5-tricarboxyphenylethylbenzene ($C_{33}H_{18}O_6$), 9,10-anthracenedicarboxylic acid ($C_{16}H_{10}O_4$), imidazole ($C_3H_4N_2$), oxalic acid dihydrate ($C_2H_2O_4 \cdot 2H_2O$), 2,2'-diamino-4,4'-stilbenedicarboxylic acid ($C_{16}H_{14}N_2O_4$), 2,5-diaminoterephthalic acid ($C_8H_8N_2O_4$), 2,2'-dinitro-4,4'-stilbenedicarboxylic acid ($C_{16}H_{10}N_2O_8$), 2,5-dihydroxy-terephthalic acid ($C_8H_6O_6$), 3,3',5,5'-tetracarboxydiphenyl-methane ($C_{17}H_{12}O_8$), 1,2,4,5-tetrakis(4-carboxyphenyl)benzene ($C_{34}H_{22}O_8$), terephthalic acid ($C_8H_6O_4$), 4,4',4''-s-triazine-2,4,6-triyl-tribenzoic acid ($C_{24}H_{15}N_3O_6$), 1,3,5-tris(4'-carboxy[1,1'-biphenyl]-4-yl)benzene ($C_{45}H_{30}O_6$), 1,3,5-tris(4-carboxyphenyl)benzene ($C_{27}H_{18}O_6$), trimesic acid ($C_9H_6O_6$), 2,6-naphthalenedicarboxylic acid ($C_{12}H_8O_4$), 2-hydroxyterephthalic acid ($C_8H_6O_5$), biphenyl-3,3',5,5'-tetracarboxylic acid ($C_{16}H_{10}O_8$), biphenyl-3,4',5-tricarboxylic acid ($C_{15}H_{10}O_6$), 5-bromoisophthalic acid ($C_8H_5BrO_4$), malonic acid ($C_3H_4O_4$), and the like. Among these, from the viewpoints of cost, performance and quality assurance, 2-methylimidazole is preferred.

By using the production method described above, a metal-organic framework having a metal ion and an organic ligand linked together is produced within the mixed solution of the aforementioned aqueous solution and the aforementioned alcohol solution. This metal-organic framework is produced as a precipitate within the mixed solution. Examples of the metal-organic framework include zeolite imidazole frameworks such as ZIF-8, ZIF-70, ZIF-76, IRMOF-8, MAF-4, UTSA-38, IRMOF-1, ZnPO-MOF, MOF-5, UMCM-1, MIL-53(A1), MOF-14, PCN-12, MOF-74-Mg, Mg3(BHTC)$_2$, MIL-53(Fe), MIL-88B, MIL-88C-Fe, MOF-74-Fe, and other frameworks. Zeolites containing zinc such as ZIF-8 are particularly preferred. Because zinc has a low metal vaporization temperature, treatment can be performed at low temperatures, and the amount of metal (zinc) contained in the product can be reduced, which is desirable.

The obtained metal-organic framework is collected by filtering the mixed solution containing the framework.

The metal-organic framework has a structure in which the metal ion and the crosslinking organic ligand are arranged alternately and linked together. The metal-organic framework itself has uniform pores. When a metal-organic framework is used for a catalyst, it is important that the framework has fine pores and a large specific surface area. However, in those cases where the metal-organic framework is used as an electrode material, ensuring high conductivity is important.

Therefore, a metal-organic framework of low conductivity cannot be used, as is, as the electrode material.

Accordingly, in the present embodiment, the metal-organic framework is subjected to a heat treatment to carbonize the organic ligand (carbonization step), and the metal is then removed from the carbonized framework (metal removal step).

Simply performing a heat treatment of the metal-organic framework does not enable the metal to be removed from the metal-organic framework, but merely yields nanoparticles containing metal with the size of several nanometers (nm) (a carbonized framework, hereafter also referred to as a "sintered compact").

By removing the metal from these metal-containing nanoparticles (the sintered compact), pores from which the metal has been extracted (pores in the meso region) are formed in the nanoporous carbon.

The metal diameter varies depending on the type of metal used in forming the metal-organic framework. The metal diameter is substantially uniform for each type of metal, and therefore the pore size of the obtained nanoporous carbon is also uniform.

In the carbonization step (hereafter referred to as "the step D"), the metal-organic framework described above is heat treated, and the organic ligand that constitutes the metal-organic framework is carbonized.

As a result, the organic ligand within the metal-organic framework is carbonized, thus producing a structure (sintered compact) formed from a reticular skeleton formed solely from carbon, and metal that exist within the skeleton.

The step D is preferably performed under an atmosphere selected from among a nitrogen atmosphere, an inert gas atmosphere and a vacuum atmosphere. Of these, from the viewpoint of cost, a nitrogen atmosphere is particularly preferred.

The rate of temperature increase in the heat treatment of the metal-organic framework is preferably at least 1° C./minute but not more than 20° C./minute, and more preferably at least 5° C./minute but not more than 10° C./minute. The "rate of temperature increase" in the step D is the rate at which the temperature is raised from the time heating of the metal-organic framework is started until the heat treatment temperature is reached.

The temperature at which the step D is performed, namely the heat treatment temperature for the metal-organic framework, is preferably at least 600° C. but not more than 2,200° C., and more preferably at least 800° C. but not more than 1,000° C.

Provided the treatment temperature for the metal-organic framework is within the above range, the organic ligand can be satisfactorily carbonized.

The pore size of the pores of the nanoporous carbon described above can be controlled by altering not only the type of metal used in forming the metal-organic framework, but also the heat treatment temperature for the metal-organic framework.

The heat treatment time for the metal-organic framework (the time for which the heat treatment temperature is maintained) is preferably at least 1 hour but not longer than 20 hours, and is more preferably at least 5 hours but no longer than 10 hours.

Provided the heat treatment time for the metal-organic framework is within the above range, the organic ligand can be satisfactorily carbonized.

In the metal removal step (hereafter also referred to as "the step E"), the sintered compact produced in the step D is added to an acid solution or an alkali solution to dissolve the metal contained in the sintered compact, thereby producing a solid that does not contain metal.

In this step E, by adding the sintered compact to an acid solution, the metal contained in the sintered compact is dissolved, yielding a nanoporous carbon having a reticular skeleton formed solely from carbon.

The acid solution is preferably a solution containing an acid such as hydrofluoric acid, hydrochloric acid, sulfuric acid, nitric acid, or the like. Among these acids, from the viewpoint of removing impurities, a solution containing hydrofluoric acid is preferred. One of these acids may be used alone, or a combination of two or more acids may be used.

The concentration of the acid solution is preferably at least 5 vol % but not more than 30 vol %, and more preferably at least 10 vol % but not more than 15 vol %.

Provided the concentration of the acid solution is within the above range, the metal contained in the sintered compact can be dissolved efficiently, enabling only the metal to be removed from the sintered compact.

The alkali solution is preferably a solution containing an alkali such as potassium hydroxide, sodium hydroxide, or the like. One of these alkalis may be used alone, or a combination of two or more alkalis may be used.

The concentration of the alkali solution is preferably at least 5 vol % but not more than 30 vol %, and more preferably at least 10 vol % but not more than 15 vol %.

Provided the concentration of the alkali solution is within the above range, the metal contained in the sintered compact can be dissolved efficiently, enabling only the metal to be removed from the sintered compact.

Subsequently, the acid solution or alkali solution is filtered, and the solid is collected.

Even when the sintered compact is added to an acid solution or an alkali solution in this manner, a single operation is sometimes not sufficient to completely dissolve and remove all of the metal contained in the sintered compact. As a result, the collected solid sometimes contains both product that does not contain metal (the nanoporous carbon) and the sintered compact.

Accordingly, the solid is preferably added to an acid solution or an alkali solution in the same manner as described above, and this operation is preferably performed at least once but not more than 10 times, and more preferably at least 3 limes but not more than 5 times.

In this manner, by conducting a plurality of repetitions of the operation of adding the solid (the product that does not contain metal and the sintered compact) to an acid solution or an alkali solution, the metal contained in the sintered compact can be dissolved efficiently, enabling only the metal to be removed from the sintered compact.

By performing the type of step F described above, a solid that does not contain metal is produced in the acid solution or alkali solution. This solid that does not contain metal is produced as a precipitate within the acid solution or alkali solution.

The thus obtained solid that does not contain metal is collected by filtering the acid solution or alkali solution containing the solid.

Subsequently, the solid that does not contain metal is washed with water and then dried to obtain the nanoporous carbon described above.

By using this method for producing the nanoporous carbon, the nanoporous carbon described above can be obtained.

In the thus obtained nanoporous carbon, the metal that existed within the reticular skeleton formed solely from carbon has been removed. The portions from which the metal has been removed form pores within the nanoporous carbon. Furthermore, the skeleton formed solely from carbon is formed of carbon-carbon chemical bonds. Accordingly, the nanoporous carbon has pores (reticular holes) of substantially uniform size, and also has a high specific surface area and porosity.

[Electrode Material]

The electrode material of one embodiment of the present invention contains the core-shell composite described above as the electrode active material. The electrode material of this embodiment contains, for example, the core-shell composite described above, a conductivity assistant, and a binder.

Examples of the conductivity assistant include the types of materials typically used in electrode materials, and specific examples include carbon black and nanocarbon such as carbon nanotubes and the like.

Examples of the binder include the types of materials typically used in electrode materials, and specific examples include polytetrafluoroethylene (PTFE), polyvinylidene fluoride (PVDF), acrylonitrile-butadiene rubber (NBR), styrene-butadiene rubber (SBR), acrylic resins, olefin resins, polyimide resins, polyamide resins, sodium methyl cellulose (CMC) and the like. One of these binders may be used alone, or a combination of two or more binders may be used.

The amount of the core-shell composite in the electrode material of this embodiment is preferably at least 70 wt % but not more than 96 wt %, and is more preferably at least 90 wt % but not more than 96 wt %.

The amount of the conductivity assistant in the electrode material of this embodiment is preferably at least 2 wt % but not more than 10 wt %, and is more preferably at least 2 wt % but not more than 5 wt %.

The amount of the binder in the electrode material of this embodiment is preferably at least 2 wt % but not more than 20 wt %, and is more preferably at least 2 wt % but not more than 10 wt %.

The electrode material of this embodiment may also contain an organic solvent such as N-methyl-2-pyrrolidone or water as a solvent.

The electrode material of this embodiment may be used as a positive electrode material for forming a positive electrode, or as a negative electrode material for forming a negative electrode.

By using the electrode material of the present embodiment, an electrode that enables the production of an electric double-layer capacitor having a large electrostatic capacitance, or an electrode that enables the production of a secondary battery having a large discharge capacity can be provided.

[Catalyst]

The catalyst of one embodiment of the present invention contains the core-shell composite described above.

The catalyst of this embodiment contains, for example, a catalyst support formed from the core-shell composite described above, and a catalyst substance supported on that catalyst support.

There are no particular limitations on the catalyst substance, and examples include metals such as platinum, gold, palladium, nickel and cobalt.

There are no particular limitations on the amount of supported catalyst substance in the catalyst of this embodiment, and when the amount is expressed as a weight of the catalyst substance per unit weight of the core-shell composite, then the amount is preferably at least 1 wt % but not more than 50 wt %, and is more preferably at least 1 wt % but not more than 10 wt %.

By using the catalyst of this embodiment, the amount of supported catalyst substance can be increased, enabling the catalytic activity to be enhanced.

[Electrode]

The electrode of one embodiment of the present invention contains the electrode material described above.

The electrode of this embodiment contains, for example, a current collector, and an electrode active material layer composed of the above electrode material formed on one surface or both surfaces of the current collector.

There are no particular limitations on the current collector, and for example, substrates formed from low-resistance metals such as copper, aluminum, nickel, stainless steel, or the like may be used.

There are no particular limitations on the thickness of the current collector, and for example, the thickness is preferably at least 6 μm but not more than 30 μm, and more preferably at least 10 μm but not more than 20 μm.

There are no particular limitations on the thickness of the electrode active material layer (the electrode thickness), and when the electrode thickness is too great, then detachment of the electrode from the current collector or cracking of the electrode active material layer become more likely, resulting in an undesirable increase in the electrode resistance, and therefore the thickness of a single side is preferably at least 40 μm but not more than 130 μm, and more preferably at least 60 μm but not more than 100 μm. Further, the electrode thickness may vary depending on the binder, and if a binder having good flexibility and binding strength is used, then the electrode thickness may be increased.

The electrode active material layer is a positive electrode active material layer or a negative electrode active material layer formed from the electrode material described above.

By using the electrode of this embodiment, application to an electric double-layer capacitor enables the electrostatic capacitance to be increased, and application to a secondary battery enables the discharge capacity to be increased.

[Secondary Battery]

A secondary battery of one embodiment of the present invention contains the electrode described above.

Examples of the secondary battery of this embodiment include non-aqueous electrolyte secondary batteries.

Figure 3:
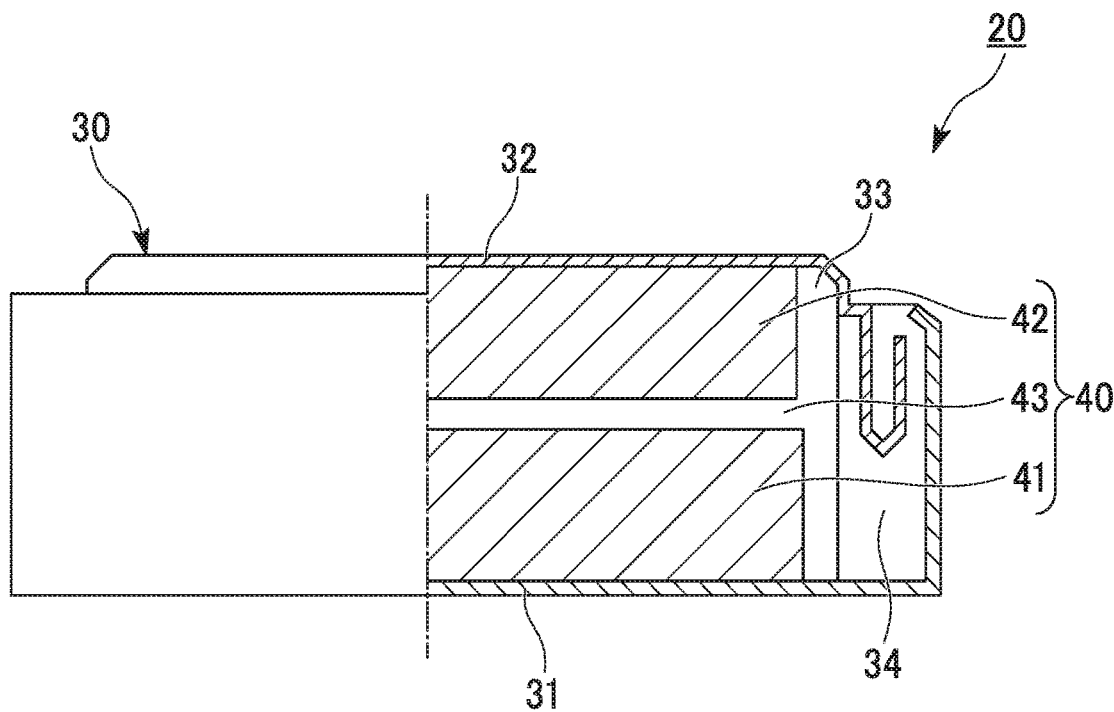
FIG. 3 is a partial cross-sectional view illustrating the basic structure of a coin battery that represents one embodiment of the secondary battery of the present invention.

FIG. 3 is a partial cross-sectional view illustrating the basic structure of a coin battery as one example of the secondary battery of this embodiment.

This secondary battery (coin battery) 20 of the present embodiment contains a case 30 and an electrode layer 40 housed inside this case 30.

The case 30 includes a positive electrode can 31 formed from a case that is open at one end, and a negative electrode can 32 that is disposed within the opening of the positive electrode can 31. The positive electrode can 31 and the negative electrode can 32 are constructed such that by disposing the negative electrode can 32 within the opening of the positive electrode can 31, a space 33 for housing the electrode layer 40 is formed between the positive electrode can 31 and the negative electrode can 32.

The positive electrode can 31 functions as the positive electrode terminal of the secondary battery 20. The negative electrode can 32 functions as the negative electrode terminal of the secondary battery 20.

A gasket 34 is provided around the outside edge of the case 30. The gasket 34 is provided so as to maintain a state of insulation between the positive electrode can 31 and the negative electrode can 32. Further, the gasket 34 also seals the gap between the positive electrode can 31 and the negative electrode can 32, and has the functions of maintaining the airtightness of the interior of the case 30 and preventing leakage of the electrolyte from the case 30.

The electrode layer 40 has a positive electrode 41, a negative electrode 42 and a separator 43. The positive electrode 41 and the negative electrode 42 are stacked with the separator 43 disposed therebetween. An electrolyte not shown in the figure is disposed between the positive electrode 41 and the negative electrode 42. The electrode layer 40 is housed inside the case 30 so that the positive electrode 41 contacts the internal surface of the positive electrode can 31 and the negative electrode 42 contacts the internal surface of the negative electrode can 32.

Examples of materials that can be used as the case 30 include cases formed from aluminum, stainless steel (SUS301) or iron, in which the portions that make contact with the electrode layer 40 have been subjected to a nickel plating treatment.

Electrodes containing the electrode material described above can be used as the positive electrode 41 and the negative electrode 42.

Further, at least one of the positive electrode 41 and the negative electrode 42 may be an electrode containing the above electrode material.

In those cases where the positive electrode 41 contains the electrode material described above, the negative electrode 42 may be an electrode having a negative electrode current collector and a negative electrode active material layer formed on one surface or both surfaces of that negative electrode current collector.

A metal foil formed from a metal such as copper and the like may be used as the negative electrode current collector.

The negative electrode active material layer is formed by applying a paste-like negative electrode material containing the negative electrode active material, a binder and a solvent to the negative electrode current collector, drying the applied material, and then applying compression to increase the electrode density if required.

Examples of the negative electrode active material include powders of natural graphite, artificial graphite, fired products of organic compounds such as phenol resins, and carbonaceous substances such as coke and the like.

Examples of the binder include fluororesins such as polyvinylidene fluoride (PVDF) and polytetrafluoroethylene (PTFE), as well as acrylonitrile-butadiene rubber (NBR), styrene-butadiene rubber (SBR), acrylic resins, olefin resins, polyimide resins, polyamide resins, sodium ethyl cellulose (CMC), and the like.

Examples of the solvent include organic solvents such as N-methyl-2-pyrrolidone, water, or the like.

In those cases where the negative electrode 42 is an electrode that contains the electrode material described above, the positive electrode 41 may be an electrode having a positive electrode current collector and a positive electrode active material layer formed on one surface or both surfaces of that positive electrode current collector.

A metal foil formed from a metal such as aluminum and the like may be used as the positive electrode current collector.

The positive electrode active material layer is formed by applying a paste-like positive electrode material containing the positive electrode active material, a binder and a solvent to the positive electrode current collector, drying the applied material, and then applying compression to increase the electrode density if required.

Examples of the positive electrode active material include conductive polymer materials containing a material of the present embodiment, such as polyaniline, polythiophene-polystyrene sulfonate (PEDOT/PSS) and the like.

Examples of the binder include polyvinylidene fluoride (PVDF), polytetrafluoroethylene (PTFE), fluororubber, ethylene-propylene-diene rubber, styrene-butadiene rubber, cellulose-based resins, polyacrylic resins, and the like.

Examples of the solvent include organic solvents such as N-methyl-2-pyrrolidone and the like.

Examples of materials that can be used as the separator 33 include porous thin films of polyethylene or polypropylene or the like having a plurality of fine pores.

Examples of the electrolyte include a solution obtained by dissolving a lithium salt in an organic solvent.

Examples of the organic solvent include cyclic carbonates such as ethylene carbonate, propylene carbonate, butylene carbonate and trifluoropropylene carbonate, and chain-like carbonates such as diethyl carbonate, dimethyl carbonate, ethyl methyl carbonate, dipropyl carbonate, and other carbonates. One of these organic solvents may be used alone, or a combination of two or more solvents may be used.

Examples of the lithium salt include $LiPF_6$, $LiBF_4$, $LiClO_4$, $LiAsF_6$, $LiN(CF_3SO_2)_2$, and the like.

By using the secondary battery of this embodiment, because the electrode includes the core-shell composite described above as the electrode material, a greater number of electrolyte ions from the organic electrolyte can be adsorbed or doped to the electrode, meaning the discharge capacity can be increased.

[Electric Double-Layer Capacitor]

The electric double-layer capacitor of one embodiment of the present invention contains the electrode described above.

The electric double-layer capacitor of this embodiment contains, for example, an external case, a capacitor main body, an electrolyte (electrolyte solution), and a control board for controlling the voltage of the capacitor. Further, in this electric double-layer capacitor, the capacitor main body and the electrolyte are enclosed inside the external case, and a positive electrode tab lead and a negative electrode tab lead are fed from the capacitor main body to locations on the outside of the external case.

Figure 4:
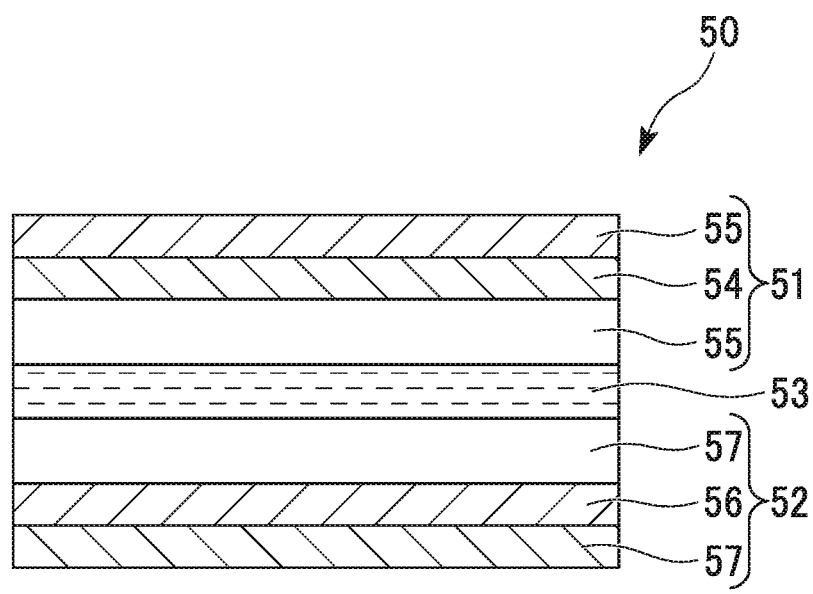
FIG. 4 is a cross-sectional view illustrating the basic structure of one embodiment of an electrode layer that constitutes the capacitor main body of one embodiment of the electric double-layer capacitor of the present invention.

FIG. 4 is a cross-sectional view illustrating the basic structure of one embodiment of an electrode layer that constitutes part of the capacitor main body of the electric double-layer capacitor of the present embodiment.

In the capacitor main body of the electric double-layer capacitor of this embodiment, a plurality of the electrode layers 50 illustrated in FIG. 4 are stacked with separators disposed therebetween.

The electrode layer 50 contains a cathode 51, an anode 52 and an electrolyte 53. The cathode 51 and the anode 52 are stacked with the electrolyte 53 provided therebetween. A separator not shown in the figure is disposed between the cathode 51 and the anode 52.

The cathode 51 has a current collector 54 and active material layers 55 and 55 composed of the electrode material described above formed on both surfaces of the current collector 54.

The anode 52 has a current collector 56 and active material layers 57 and 57 composed of the electrode material described above formed on both surfaces of the current collector 56.

In other words, the cathode 51 and the anode 52 are composed of electrodes containing the electrode material described above.

In the capacitor main body, the electrode layers 50 are stacked so that the cathode 51 and the anode 52 are arranged alternately with separators disposed therebetween.

Either an organic electrolyte containing an organic solvent or an aqueous solution electrolyte containing sulfuric acid or an alkali can be used as the electrolyte 53.

However, because the ion diameter differs for the electrolyte ions contained in the organic electrolyte and the electrolyte ions contained in the aqueous solution electrolyte, the pore size of the core-shell composite described above must be adjusted to a size appropriate for the electrolyte, so as to ensure the most efficient adsorption of the electrolyte ions.

The electrolyte 53 contains electrolyte ions that can adsorb to and desorb from the cathode 51 and the anode 52.

There are no particular limitations on the type of electrolyte ion used, and any of the electrolyte ions typically used in conventional electric double-layer capacitors can be used.

In the case of an organic electrolyte, examples of the electrolyte ions include ammonium salts, phosphonium salts, and ionic liquids.

Examples of the ammonium salts include tetraethylammonium (TEA) salts, triethylammonium (TEMA) salts, and the like.

Examples of the phosphonium salts include spiro compounds having two five-membered rings.

There are no particular limitations on the ionic liquids, and in terms of facilitating movement of the electrolyte ions, materials having a viscosity that is as low as possible and a high conductance (conductivity) are preferred.

Examples of the cation that constitutes the ionic liquid include imidazolium ions and pyridinium ions.

Examples of the imidazolium ions include the EMIm ion, 1-methyl-1-propylpyrrolidinium (MPPy) ion, 1-methyl-1-propylpiperidinium (MPPi) ion, and the like.

Examples of the pyridinium ions include the 1-ethylpyridinium ion, 1-butylpyridinium ion.

Examples of the anion that constitutes the ionic liquid include the $BF_4$ ion, $PF_6$ ion, $[(CF_3SO_2)_2N]$ ion, FSI (bis(fluorosulfonyl)imide) ion, TFSI (bis(trifluoromethylsulfonyl)imide) ion, and the like.

Examples of the organic solvent used for dissolving these electrolyte ions to prepare the organic electrolyte include acetonitrile, propylene carbonate, dimethyl carbonate, diethyl carbonate, γ-butyrolactone, sulfolane, N,N-dimethylformamide, dimethyl sulfoxide, and the like. One of these organic solvents may be used alone, or a combination of two or more solvents may be used.

Examples of the aqueous solution electrolyte include sulfuric acid solutions, and alkaline aqueous solutions of sodium hydroxide or potassium hydroxide or the like.

Examples of the current collectors 54 and 56 include metal foils formed from metals such as etched aluminum, aluminum, nickel or the like. The current collectors must be electrochemically stable during charging and discharging. Current collectors are preferably formed from metals which do not dissolve, and do not suffer effects such as the formation of a passivation film such as an oxide film that increases the electrical resistance.

For the separator, for reasons including preventing short-circuits of the cathode 51 and the anode 52, and ensuring favorable liquid retention of the electrolyte, a cellulose-based paper-like separator or a glass fiber separator or the like is typically used.

By using the electric double-layer capacitor of the present embodiment, because the electrodes include the core-shell composite described above as the electrode material, a greater number of electrolyte ions from the organic electrolyte can be adsorbed or doped to the electrode, meaning the electrostatic capacitance can be increased.

In the electric double-layer capacitor of this embodiment, it is preferable to use a core-shell composite containing a carbon porous body having a pore size that is larger than the diameter of the electrolyte ions, thus enabling the greatest amount of electrolyte ions to be adsorbed or doped, and enabling the highest possible electrostatic capacitance to be obtained. En other words, it is preferable to use a core-shell composite containing a carbon porous body having a pore size suited to the electrolyte ions.

For example, in the case where the typical tetraethylammonium tetrafluoroborate (TEA-BF4) is used as the organic electrolyte in an electric double-layer capacitor, an average pore size of at least 1.5 nm but not more than 3 nm in the carbon porous body that constitutes the core-shell composite is the most suitable pore size.

On the other hand, when an aqueous solution electrolyte is used in the electric double-layer capacitor, the cation is a hydrogen ion (oxonium ion) and the anion is a hydroxide ion, both of which have a smaller ionic diameter than the case where an organic electrolyte is used. For example, the average diameter of the hydroxide ion is 0.3 nm, and therefore when an aqueous solution electrolyte is used, an average pore size of at least 1 nm but not more than 2 nm in the carbon porous body that constitutes the core-shell composite is the most suitable pore size.

The reason that the electrostatic capacitance decreases as the average pore size of the carbon porous body increases is because, in the carbon porous body, the specific surface area decreases as the average pore size increases, meaning the absolute amount of electrolyte ions that can be adsorbed to the carbon porous body decreases.

In this embodiment, although the terminology "electric double-layer capacitor" is used, in the core-shell composite of the embodiment, because anion doping and de-doping reactions of the conductive polymer are used rather than utilizing ion adsorption and desorption to the pore surfaces of the carbon porous body, strictly speaking, the device cannot be called an electric double-layer capacitor. However, in the present embodiment, for the sake of simplicity and because the techniques are similar, the term "electric double-layer capacitor" is used.

EXAMPLES

The present invention is described below in further detail using a series of examples and comparative examples, but the present invention is in no way limited by the following examples.

Example 1

[Nanoporous Carbon]

First, 175 mg of zinc acetate and 300 mg of polyvinylpyrrolidone were dissolved in 20 mL of ethanol to prepare an aqueous solution containing these components. The zinc acetate and polyvinylpyrrolidone were added to water, and the mixture was stirred for 30 minutes, with the temperature during stirring of the mixture set to 25° C.

In addition, 263 mg of 2-methylimidazole was dissolved in 20 mL of ethanol to prepare an ethanol solution including 2-methylimidazole. The 2-methylimidazole was added to the ethanol, and the mixture was stirred for 30 minutes, with the temperature during stirring of the mixture set to 25° C.

The alcohol solution described above was added to the aqueous solution described above, and the solutions were stirred at 25° C. for 5 minutes. As a result, after a period of 24 hours, a metal-organic framework ZIF-8 was produced as a precipitate within the mixed solution of the aqueous solution and the ethanol solution.

By filtering the mixed solution containing the metal-organic framework, the metal-organic framework was collected.

Next, the thus obtained metal-organic framework was subjected to a heat treatment under a nitrogen atmosphere. The rate of temperature increase during this heat treatment of the metal-organic framework was 5° C./minute, the firing temperature following completion of the temperature increase was 800° C., and the firing time following completion of the temperature increase was 4 hours.

Following heat treatment, a process of adding the metal-organic framework to a hydrofluoric acid solution, dissolving the zinc contained within the metal-organic framework and then performing a filtration was repeated 4 times. The concentration of the hydrofluoric acid solution was 10 vol %.

Subsequently, the hydrofluoric acid solution was filtered, the solid contained in the hydrofluoric acid solution was collected, and the collected solid was washed in distilled water.

The solid was then dried at 25° C. for 24 hours to obtain a nanoporous carbon.

Analysis of the thus obtained nanoporous carbon using a specific surface area/pore distribution analyzer (product name: ASAP-2020) manufactured by Shimadzu Corporation revealed a specific surface area determined by the BET method of 1,500 $m^2/g$, and an average pore size of 1.3 nm. Further, the pore distribution curve determined from the nitrogen adsorption isotherm using non-localized density functional theory had a peak within the range of pore sizes from at least 0.4 nm to not more than 2.4 nm, and the full width at half maximum centered on that peak was 0.6 nm.

[Core-Shell Composite]

Subsequently, 10 mL of ethanol was added to 30 mL of a 1 mol/L perchloric acid solution, and the components were mixed to prepare an alcohol solution.

Next, 0.13 mg of aniline monomer was added to 40 mL of this alcohol solution, and these components were stirred and mixed at −5° C. for 10 minutes, thereby dissolving the aniline monomer in the alcohol solution to prepare a first solution containing the aniline monomer.

In addition, 0.068 mg of ammonium persulfate was added to 10 mL of a 1 mol/L perchloric acid solution, and the components were mixed to prepare a second solution containing ammonium persulfate.

Next, the first solution and the second solution were mixed to prepare a mixed solution of the two solutions. The mixing ratio between the first solution and the second solution was a volumetric ratio of 1:4.

The nanoporous carbon described above was then added to this mixed solution, and the mixture was stirred and mixed at −5° C. for 5 hours to polymerize the aniline monomer.

Subsequently, the mixed solution was filtered, the solid contained in the mixed solution was collected, and the collected solid was washed with distilled water.

The solid was dried at 25° C. for 24 hours, thus obtaining a core-shell composite of Example 1 containing the nanoporous carbon, and a shell layer formed from conductive polymer (polyaniline) nanorods that extended outward from pores on the surface of the nanoporous carbon.

[Coin Battery]

The core-shell composite of Example 1 and polyvinylidene fluoride were mixed together to prepare an electrode material of Example 1.

In the electrode material of Example 1, the mixing ratio between the core-shell composite and the polyvinylidene fluoride was a weight ratio of 90:10.

This electrode material was applied to one surface of a 20 μm nickel foil using a doctor blade to form a coating film, and the coating film was dried at 160° C. to form an active material layer on the nickel foil, and obtain a positive electrode and a negative electrode.

The positive electrode and the negative electrode were dried at 100° C. for 24 hours using a vacuum dryer.

The positive electrode and the negative electrode were then stacked together with a paper separator (product name: TF40-30, manufactured by Nippon Kodoshi Corporation) provided therebetween, and the stacked structure was placed inside the space of the type of case illustrated in FIG. 3.

Subsequently, 0.1 mL of a 1 mol/L sulfuric acid solution was added as an aqueous solution electrolyte to the space inside the case housing the positive electrode and the negative electrode, and a 2032-type coin battery of Example 1 was produced inside an argon glove box.

The coin battery of Example 1 was scanned at room temperature (23° C.) using a VSP device manufactured by Bio-Logic Science Instruments SAS, at scan rates of at least 1 mV/s but not more than 200 mV/s, and within a range from at least 0 V to not more than 0.8 V. The electrostatic capacitance of the coin battery of Example 1 was obtained based on the discharge capacity obtained when the coin battery of Example 1 was scanned at a scan rate of 1 mV/s. When the electrostatic capacitance of Comparative Example 1 was deemed to be 100, the electrostatic capacitance of Example 1 was 1120, when the electrostatic capacitance of Comparative Example 2 was deemed to be 100, the electrostatic capacitance of Example 1 was 450, when the electrostatic capacitance of Comparative Example 3 was deemed to be 100, the electrostatic capacitance of Example 1 was 170.

Example 2

[Coin Battery]

With the exceptions of using 0.1 mL of a 1 mol/L tetraethylammonium tetrafluoroborate solution (TEA-BF4) as an organic electrolyte, using an etched aluminum foil for the current collector of the positive electrode, and using an activated carbon (product name: MSP-20) manufactured by Kansai Coke and Chemicals Co., Ltd. for the negative electrode, a 2032-type coin battery of Example 2 was produced in the same manner as Example 1. The negative electrode was produced by mixing the activated carbon MSP-20, carbon black as a conductive material, and polyvinylidene fluoride (PVDF) as a binder in a ratio of 90:5:5 wt % with N-methyl-2-pyrrolidone to obtain a paste, applying this paste to an etched aluminum foil using a doctor blade, and then drying the paste at 160° C.

The coin battery of Example 2 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 2 was obtained based on the discharge capacity obtained when the coin battery of Example 2 was scanned at a scan rate of 1 mV/s. When the electrostatic capacitance of Comparative Example 5 was deemed to be 100, the electrostatic capacitance of Example 2 was 410, and when the electrostatic capacitance of Comparative Example 6 was deemed to be 100, the electrostatic capacitance of Example 2 was 135.

Example 3

[Core-Shell Composite]

The nanoporous carbon obtained in Example 1 was immersed for 10 minutes in a water dispersion prepared by dispersing polythiophene-polystyrene sulfonate (PEDOT/PSS) in water.

Subsequently, the dispersion was filtered, the solid contained in the dispersion was collected, and the collected solid was washed with distilled water.

The solid was vacuum-dried at 80° C. for 24 hours, thus obtaining a core-shell composite of Example 3 containing the nanoporous carbon, and a shell layer formed from conductive polymer (PEDOT/PSS) nanorods that extended outward from pores on the surface of the nanoporous carbon.

[Coin Battery]

With the exception of using the core-shell composite of Example 3, a 2032-type coin battery of Example 3 was produced in the same manner as Example 1.

The electrostatic capacitance of the coin battery of Example 3 was obtained in the same manner as Example 1. When the electrostatic capacitance of Comparative Example 4 was deemed to be 100, the electrostatic capacitance of Example 3 was 620.

Example 4

[Core-Shell Composite]

With the exception of altering the firing temperature of the metal-organic framework to 1,000° C., a nanoporous carbon of Example 4 was obtained in the same manner as Example 1.

Analysis of the thus obtained nanoporous carbon in the same manner as Example 1 revealed a specific surface area of 1,210 $m^2/g$ and an average pore size of 1.1 nm, the pore distribution curve determined from the nitrogen adsorption isotherm using non-localized density functional theory had a peak within the range of pore sizes from at least 0.4 nm to not more than 1.8 nm, and the full width at half maximum centered on that peak was 0.6 nm.

Subsequently, the same procedure as Example 1 was used to obtain a core-shell composite of Example 4.

[Coin Battery]

With the exception of using the core-shell composite of Example 4, a 2032-type coin battery of Example 4 was produced in the same manner as Example 1.

The electrostatic capacitance of the coin battery of Example 4 was obtained in the same manner as Example 1. When the electrostatic capacitance of Comparative Example 1 was deemed to be 100, the electrostatic capacitance of Example 4 was 980.

Example 5

[Core-Shell Composite]

With the exception of altering the firing temperature of the metal-organic framework to 1,200° C., a nanoporous carbon of Example 5 was obtained in the same manner as Example 1.

Analysis of the thus obtained nanoporous carbon in the same manner as Example 1 revealed a specific surface area of 890 $m^2/g$ and an average pore size of 0.9 nm, the pore distribution curve determined from the nitrogen adsorption isotherm using non-localized density functional theory had a peak within the range of pore sizes from at least 0.6 nm to not more than 1.6 nm, and the full width at half maximum centered on that peak was 0.5 nm.

Subsequently, the same procedure as Example 1 was used to obtain a core-shell composite of Example 5.

[Coin Battery]

With the exception of using the core-shell composite of Example 5, a 2032-type coin battery of Example 5 was produced in the same manner as Example 1.

The electrostatic capacitance of the coin battery of Example 5 was obtained in the same manner as Example 1. When the electrostatic capacitance of Comparative Example 1 was deemed to be 100, the electrostatic capacitance of Example 5 was 580.

Example 6

[Nanoporous Carbon, Core-Shell Composite]

With the exception of altering the firing temperature of the metal-organic framework to 1,600° C., a nanoporous carbon of Example 6 was obtained in the same manner as Example 1.

Analysis of the thus obtained nanoporous carbon in the same manner as Example 1 revealed a specific surface area of 520 $m^2/g$ and an average pore size of 0.5 nm, the pore distribution curve determined from the nitrogen adsorption isotherm using non-localized density functional theory had a peak within the range of pore sizes from at least 0.1 nm to not more than 1.0 nm, and the full width at half maximum centered on that peak was 0.5 nm.

Subsequently, the same procedure as Example 1 was used to obtain a core-shell composite of Example 6.

[Coin Battery]

With the exception of using the core-shell composite of Example 6, a 2032-type coin battery of Example 6 was produced in the same manner as Example 1.

The electrostatic capacitance of the coin battery of Example 6 was obtained in the same manner as Example 1. When the electrostatic capacitance of Comparative Example 1 was deemed to be 100, the electrostatic capacitance of Example 6 was 230.

Example 7

[Nanoporous Carbon, Core-Shell Composite]

With the exception of adding an iron catalyst when mixing and stirring the aqueous solution described above and the alcohol solution described above, a metal-organic framework was produced in the same manner as Example 1.

With the exception of altering the firing temperature of this metal-organic framework to 700° C., a nanoporous carbon of Example 7 was obtained in the same manner as Example 1.

Analysis of the thus obtained nanoporous carbon in the same manner as Example 1 revealed a specific surface area of 1,670 $m^2/g$ and an average pore size of 1.5 nm, the pore distribution curve determined from the nitrogen adsorption isotherm using non-localized density functional theory had a peak within the range of pore sizes from at least 0.3 nm to not more than 2.5 nm, and the full width at half maximum centered on that peak was 0.7 nm.

Subsequently, the same procedure as Example 1 was used to obtain a core-shell composite of Example 7.

[Coin Battery]

With the exception of using the core-shell composite of Example 7, a 2032-type coin battery of Example 7 was produced in the same manner as Example 1.

The electrostatic capacitance of the coin battery of Example 7 was obtained in the same manner as Example 1. When the electrostatic capacitance of Comparative Example 1 was deemed to be 100, the electrostatic capacitance of Example 7 was 1,120.

Example 8

[Nanoporous Carbon, Core-Shell Composite]

With the exception of adding an iron catalyst when mixing and stirring the aqueous solution described above and the alcohol solution described above, a metal-organic framework was produced in the same manner as Example 1.

A nanoporous carbon of Example 8 was obtained at 800° C. which is set as the same the firing temperature of this metal-organic framework as Example 1.

Analysis of the thus obtained nanoporous carbon in the same manner as Example 1 revealed a specific surface area of 1,320 $m^2/g$ and an average pore size of 1.9 nm, the pore distribution curve determined from the nitrogen adsorption isotherm using non-localized density functional theory had a peak within the range of pore sizes from at least 0.8 nm to not more than 2.8 nm, and the full width at half maximum centered on that peak was 0.8 nm.

Subsequently, the same procedure as Example 1 was used to obtain a core-shell composite of Example 8.

[Coin Battery]

With the exception of using the core-shell composite of Example 8, a 2032-type coin battery of Example 8 was produced in the same manner as Example 1.

The electrostatic capacitance of the coin battery of Example 8 was obtained in the same manner as Example 1. When the electrostatic capacitance of Comparative Example 1 was deemed to be 100, the electrostatic capacitance of Example 8 was 930.

Example 9

[Nanoporous Carbon, Core-Shell Composite]

With the exception of adding an iron catalyst when mixing and stirring the aqueous solution described above and the alcohol solution described above, a metal-organic framework was produced in the same manner as Example 1.

With the exception of altering the firing temperature of this metal-organic framework to 900° C., a nanoporous carbon of Example 9 was obtained in the same manner as Example 1.

Analysis of the thus obtained nanoporous carbon in the same manner as Example 1 revealed a specific surface area of 1,160 $m^2/g$ and an average pore size of 2.4 nm, the pore distribution curve determined from the nitrogen adsorption isotherm using non-localized density functional theory had a peak within the range of pore sizes from at least 1.0 nm to not more than 3.0 nm, and the full width at half maximum centered on that peak was 0.8 nm.

Subsequently, the same procedure as Example 1 was used to obtain a core-shell composite of Example 9.

[Coin Battery]

With the exception of using the core-shell composite of Example 9, a 2032-type coin battery of Example 9 was produced in the same manner as Example 1.

The electrostatic capacitance of the coin battery of Example 9 was obtained in the same manner as Example 1. When the electrostatic capacitance of Comparative Example 1 was deemed to be 100, the electrostatic capacitance of Example 9 was 690.

Example 10

[Nanoporous Carbon, Core-Shell Composite]

With the exception of adding an iron catalyst when mixing and stirring the aqueous solution described above and the alcohol solution described above, a metal-organic framework was produced in the same manner as Example 1.

With the exception of altering the firing temperature of this metal-organic framework to 1,000° C., a nanoporous carbon of Example 10 was obtained in the same manner as Example 1.

Analysis of the thus obtained nanoporous carbon in the same manner as Example 1 revealed a specific surface area of 710 $m^2/g$ and an average pore size of 3.0 nm, the pore distribution curve determined from the nitrogen adsorption isotherm using non-localized density functional theory had a peak within the range of pore sizes from at least 1.5 nm to not more than 4.3 nm, and the full width at half maximum centered on that peak was 0.7 nm.

Subsequently, the same procedure as Example 1 was used to obtain a core-shell composite of Example 10.

[Coin Battery]

With the exception of using the core-shell composite of Example 10, a 2032-type coin battery of Example 10 was produced in the same manner as Example 1.

The electrostatic capacitance of the coin battery of Example 10 was obtained in the same manner as Example 1. When the electrostatic capacitance of Comparative Example 1 was deemed to be 100, the electrostatic capacitance of Example 10 was 410.

Example 11

[Nanoporous Carbon, Core-Shell Composite]

With the exception of adding an iron catalyst when mixing and stirring the aqueous solution described above and the alcohol solution described above, a metal-organic framework was produced in the same manner as Example 1.

With the exception of altering the firing temperature of this metal-organic framework to 1,100° C., a nanoporous carbon of Example 11 was obtained in the same manner as Example 1.

Analysis of the thus obtained nanoporous carbon in the same manner as Example 1 revealed a specific surface area of 520 $m^2/g$ and an average pore size of 3.7 nm, the pore distribution curve determined from the nitrogen adsorption isotherm using non-localized density functional theory had a peak within the range of pore sizes from at least 2.1 nm to not more than 5.3 nm, and the full width at half maximum centered on that peak was 0.7 nm.

Subsequently, the same procedure as Example 1 was used to obtain a core-shell composite of Example 11.

[Coin Battery]

With the exception of using the core-shell composite of Example 11, a 2032-type coin battery of Example 11 was produced in the same manner as Example 1.

The electrostatic capacitance of the coin battery of Example 11 was obtained in the same manner as Example 1. When the electrostatic capacitance of Comparative Example 1 was deemed to be 100, the electrostatic capacitance of Example 11 was 270.

Example 12

[Nanoporous Carbon, Core-Shell Composite]

With the exception of adding an iron catalyst when mixing and stirring the aqueous solution described above and the alcohol solution described above, a metal-organic framework was produced in the same manner as Example 1.

With the exception of altering the firing temperature of this metal-organic framework to 1,200° C., a nanoporous carbon of Example 12 was obtained in the same manner as Example 1.

Analysis of the thus obtained nanoporous carbon in the same manner as Example 1 revealed a specific surface area of 360 $m^2/g$ and an average pore size of 5.1 nm, the pore distribution curve determined from the nitrogen adsorption isotherm using non-localized density functional theory had a peak within the range of pore sizes from at least 2.9 nm to not more than 6.7 nm, and the full width at half maximum centered on that peak was 0.65 nm.

Subsequently, the same procedure as Example 1 was used to obtain a core-shell composite of Example 12.

[Coin Battery]

With the exception of using the core-shell composite of Example 12, a 2032-type coin battery of Example 12 was produced in the same manner as Example 1.

The electrostatic capacitance of the coin battery of Example 12 was obtained in the same manner as Example 1. When the electrostatic capacitance of Comparative Example 1 was deemed to be 100, the electrostatic capacitance of Example 12 was 120.

Example 13

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 4, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 13 was produced in the same manner as Example 2.

The coin battery of Example 13 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 13 was obtained based on the discharge capacity obtained when the coin battery of Example 13 was scanned at a scan rate of 1 mV/s. When the electrostatic capacitance of Comparative Example 5 was deemed to be 100, the electrostatic capacitance of Example 13 was 310.

Example 14

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 5, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 14 was produced in the same manner as Example 2.

The coin battery of Example 14 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 14 was obtained based on the discharge capacity obtained when the coin battery of Example 14 was scanned at a scan rate of 1 mV/s. When the electrostatic capacitance of Comparative Example 5 was deemed to be 100, the electrostatic capacitance of Example 14 was 230.

Example 15

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 6, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 15 was produced in the same manner as Example 2.

The coin battery of Example 15 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 15 was obtained based on the discharge capacity obtained when the coin battery of Example 15 was scanned at a scan rate of 1 mV/s. When the electrostatic capacitance of Comparative Example 5 was deemed to be 100, the electrostatic capacitance of Example 15 was 130.

Example 16

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 7, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 16 was produced in the same manner as Example 2.

The coin battery of Example 16 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 16 was obtained based on the discharge capacity obtained when the coin battery of Example 16 was scanned at a scan rate of 1 mV/s. When the electrostatic capacitance of Comparative Example 5 was deemed to be 100, the electrostatic capacitance of Example 16 was 210.

Example 17

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 8, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 17 was produced in the same manner as Example 2.

The coin battery of Example 17 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 17 was obtained based on the discharge capacity obtained when the coin battery of Example 17 was scanned at a scan rate of 1 mV/s. When the electrostatic capacitance of Comparative Example 5 was deemed to be 100, the electrostatic capacitance of Example 17 was 350.

Example 18

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 9, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 18 was produced in the same manner as Example 2.

The coin battery of Example 18 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 18 was obtained based on the discharge capacity obtained when the coin battery of Example 18 was scanned at a scan rate of 1 mV/s. When the electrostatic capacitance of Comparative Example 5 was deemed to be 100, the electrostatic capacitance of Example 18 was 250.

Example 19

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 10, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 19 was produced in the same manner as Example 2.

The coin battery of Example 19 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 19 was obtained based on the discharge capacity obtained when the coin battery of Example 19 was scanned at a scan rate of 1 mV/s. When the electrostatic capacitance of Comparative Example 5 was deemed to be 100, the electrostatic capacitance of Example 19 was 180.

Example 20

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 11, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 20 was produced in the same manner as Example 2.

The coin battery of Example 20 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 20 was obtained based on the discharge capacity obtained when the coin battery of Example 20 was scanned at a scan rate of 1 mV/s. When the electrostatic capacitance of Comparative Example 5 was deemed to be 100, the electrostatic capacitance of Example 20 was 125.

Example 21

[Coin Battery]

With the exceptions of using 0.1 mL of a 1 mol/L tetraethylammonium tetrafluoroborate solution (TEA-BF4) as an organic electrolyte, and preparing the positive electrode material by mixing the core-shell composite of Example 12, carbon black and polyvinylidene fluoride (PVDF) in a ratio of 90:5:5 wt % with N-methyl-2-pyrrolidone to obtain a paste, applying this paste to an etched aluminum foil using a doctor blade, and then drying the paste at 160° C., a 2032-type coin battery of Example 21 was produced in the same manner as Example 2.

The coin battery of Example 21 was scanned at room temperature (23° C.) using a VSP device manufactured by Bio-Logic Science Instruments SAS, at scan rates of at least 1 mV/s but not more than 200 mV/s, and within a range from at least 0 V to not more than 2.5 V. The electrostatic capacitance of the coin battery of Example 21 was obtained based on the discharge capacity obtained when the coin battery of Example 21 was scanned at a scan rate of 1 mV/s. When the electrostatic capacitance of Comparative Example 5 was deemed to be 100, the electrostatic capacitance of Example 21 was 105.

Comparative Example 1

[Coin Battery]

With the exception of using an activated carbon (product name: MSP-20) manufactured by Kansai Coke and Chemicals Co., Ltd. instead of the core-shell composite, a 2032-type coin battery of Comparative Example 1 was produced in the same manner as Example 1.

The electrostatic capacitance of the coin battery of Comparative Example 1 was obtained in the same manner as Example 1.

Comparative Example 2

[Coin Battery]

With the exception of using only the nanoporous carbon of Example 1 instead of the core-shell composite, a 2032-type coin battery of Comparative Example 2 was produced in the same manner as Example 1.

The electrostatic capacitance of the coin battery of Comparative Example 2 was obtained in the same manner as Example 1.

Comparative Example 3

[Conductive Polymer]
First, 10 mL of ethanol was added to 30 mL of a 1 mol/L perchloric acid solution, and the components were mixed to prepare an alcohol solution.

Next, 0.13 mg of aniline monomer was added to 40 mL of this alcohol solution, these components were stirred and mixed at −5° C. for 10 minutes, thereby dissolving the aniline monomer in the alcohol solution to prepare a first solution containing the aniline monomer.

In addition, 0.068 mg of ammonium persulfate was added to 10 mL of a 1 mol/L perchloric acid solution, and the components were mixed to prepare a second solution containing ammonium persulfate.

Next, the first solution and the second solution were mixed to prepare a mixed solution of the two solutions. The mixing ratio between the first solution and the second solution was a volumetric ratio of 1:4.

This mixed solution was then stirred and mixed at −5° C. for 2 hours to polymerize the aniline monomer.

Subsequently, the mixed solution was filtered, the solid contained in the mixed solution was collected, and the collected solid was washed with distilled water.

The solid was dried at 25° C. for 24 hours, thus obtaining a polyaniline powder.

[Coin Battery]
With the exception of using only the above polyaniline powder instead of the core-shell composite, a 2032-type coin battery of Comparative Example 3 was produced in the same manner as Example 1.

The electrostatic capacitance of the coin battery of Comparative Example 3 was obtained in the same manner as Example 1.

Comparative Example 4

[Coin Battery]
With the exception of using only polythiophene-polystyrene sulfonate (PEDOT/PSS) instead of the core-shell composite, a 2032-type coin battery of Comparative Example 4 was produced in the same manner as Example 1.

The electrostatic capacitance of the coin battery of Comparative Example 4 was obtained in the same manner as Example 1.

Comparative Example 5

[Coin Battery]
With the exception of using an activated carbon (product name: MSP-20) manufactured by Kansai Coke and Chemicals Co., Ltd. instead of the core-shell composite, a 2032-type coin battery of Comparative Example 5 was produced in the same manner as Example 2.

The electrostatic capacitance of the coin battery of Comparative Example 5 was obtained in the same manner as Example 1.

Comparative Example 6

[Coin Battery]
With the exception of using only the nanoporous carbon of Example 1 instead of the core-shell composite, a 2032-type coin battery of Comparative Example 6 was produced in the same manner as Example 2.

The electrostatic capacitance of the coin battery of Comparative Example 6 was obtained in the same manner as Example 1.

Comparative Example 7

[Coin Battery]
With the exception of using only the polyaniline powder of Comparative Example 3 instead of the core-shell composite, a 2032-type coin battery of Comparative Example 7 was produced in the same manner as Example 2.

The electrostatic capacitance of the coin battery of Comparative Example 7 was obtained in the same manner as Example 1.

Table 1 summarizes the results for the electrostatic capacitance of Example 1 and Example 3 when an aqueous solution electrolyte was used, compared to a value of 100 for the electrostatic capacitance of comparative examples.

TABLE 1

| Example/Reference Comparative Example | Electrostatic capacitance |
| --- | --- |
| Example 1/Comparative Example 1 | 1120 |
| Example 1/Comparative Example 2 | 450 |
| Example 1/Comparative Example 3 | 170 |
| Example 3/Comparative Example 4 | 620 |

Example 1, which used a core-shell composite composed of a core formed from a nanoporous carbon and a shell formed from conductive polymer nanorods (of polyaniline) for the electrode material, yielded an electrostatic capacitance that was more than 11 times that of Comparative Example 1 which used an activated carbon for the electrode material, yielded an electrostatic capacitance 4.5 times that of Comparative Example 2 which used a nanoporous carbon for the electrode material, and yielded an electrostatic capacitance 1.7 times that of Comparative Example 3 which used polyaniline for the electrode material. Further, Example 4, which used a core-shell composite composed of a core formed from a nanoporous carbon and a shell formed from polythiophene-polystyrene sulfonate (PEDOT/PSS) for the electrode material, yielded an electrostatic capacitance that was 6.2 times that of Comparative Example 4 which used polythiophene-polystyrene sulfonate for the electrode material.

The reasons why using the core-shell composite of the present invention for the electrode material yielded a larger electrostatic capacitance compared with the comparative examples are thought to be due to the effect obtained as a result of the size of the electrolyte ions better matching the pore size of the nanoporous carbon and the electrolyte ions adsorbing more efficiently within the pores compared with activated carbon, and the effect of the conductive polymer nanorods (of polyaniline) increasing the amount of electrolyte ion doping. In particular, because the electrostatic capacitance of Comparative Example 2 (when a nanoporous carbon was used for the electrode material) was only about 2.5 times the electrostatic capacitance of Comparative Example 1, it is thought that there is a possibility that the fact that Example 1 yielded an electrostatic capacitance that was more than 11 times the electrostatic capacitance of Comparative Example 1 is due not only to the effect of the conductive polymer nanorods in increasing the amount of electrolyte ion doping, but may also include an effect of the conductive polymer nanorods in increasing the amount of electrolyte ion adsorption to the nanoporous carbon itself.

Figure 5:
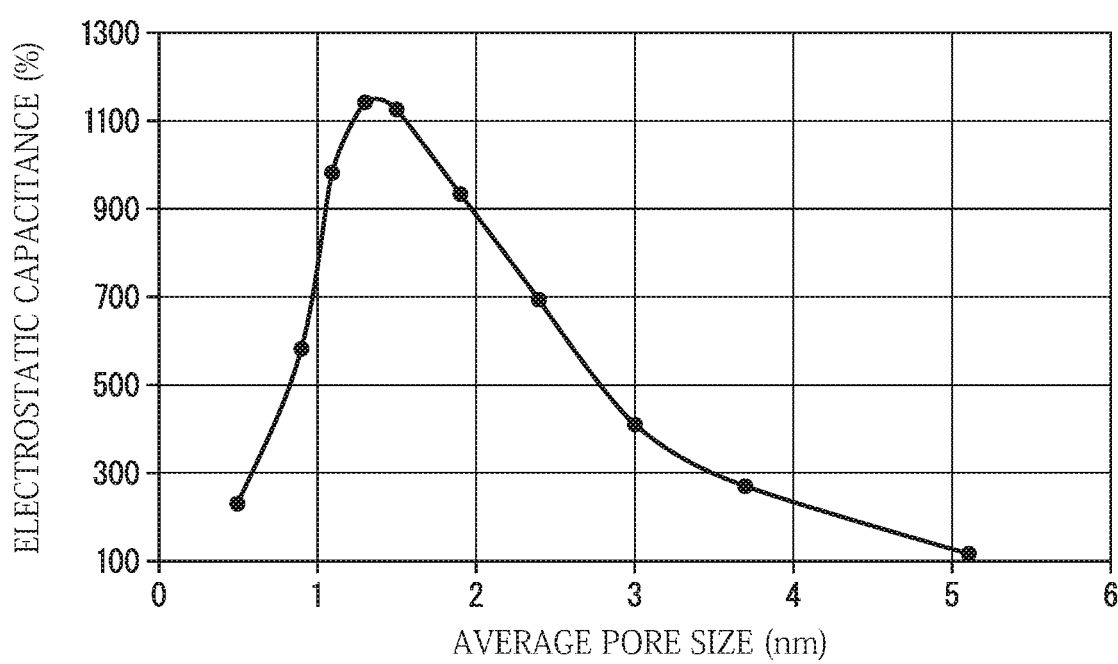
FIG. 5 is a graph illustrating the relationship between the average pore size and the electrostatic capacitance for a core-shell composite of the present invention in the case of an aqueous solution electrolyte.

FIG. 5 is a graph which, based on the examples, illustrates the relationship between the average pore size and the electrostatic capacitance (where the electrostatic capacitance of Comparative Example 1 is deemed to be 100), in the case of an aqueous solution electrolyte, for core-shell composites of the present invention composed of a core formed from nanoporous carbon and a shell formed from polyaniline.

Based on FIG. 5, it is evident that in the case of an aqueous solution electrolyte, a particularly large electrostatic capacitance improvement effect is obtained when the average pore size is at least 1 nm but not more than 2 nm. It is thought that this is due to the larger effect obtained as a result of the matching of the nanoporous carbon pore size and the size of the hydrogen ions (oxonium ions) and hydroxide ions that represent the electrolyte ions. It is also thought to indicate an effect due to the conductive polymer nanorods extending in a whisker-like manner (with substantially conical shapes) from the pores on the surface of the nanoporous carbon, meaning the conductive polymer nanorods increase the specific surface area and enable efficient doping and de-doping of electrolyte ions.

Table 2 summarizes the results for the electrostatic capacitance of Example 2 when an organic electrolyte was used, compared to a value of 100 for the electrostatic capacitance of comparative examples.

TABLE 2

| Example/Reference Comparative Example | Electrostatic capacitance |
| --- | --- |
| Example 2/Comparative Example 4 | 410 |
| Example 2/Comparative Example 5 | 135 |
| Example 2/Comparative Example 6 | 150 |

Example 2, which used a core-shell composite composed of a core formed from a nanoporous carbon and a shell formed from conductive polymer nanorods (of polyaniline) for the positive electrode material, yielded an electrostatic capacitance that was 4.1 times that of Comparative Example 5 which used an activated carbon for the electrode material, and yielded an electrostatic capacitance 1.35 times that of Comparative Example 6 which used a nanoporous carbon for the electrode material.

Figure 6:
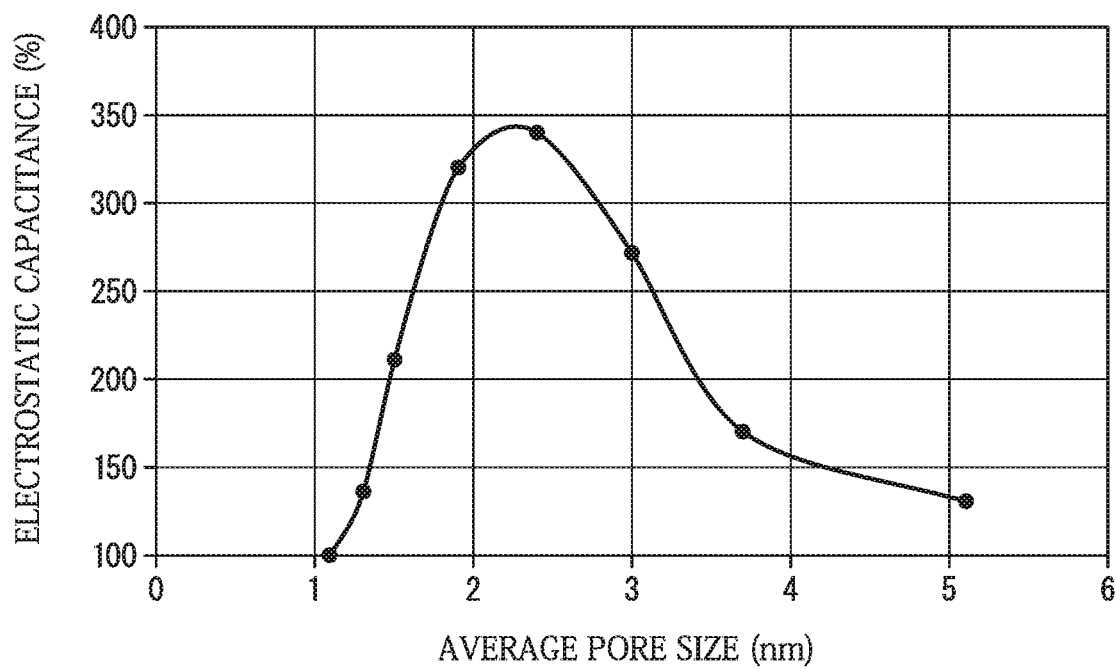
FIG. 6 is a graph illustrating the relationship between the average pore size and the electrostatic capacitance for a core-shell composite of the present invention in the case of an organic electrolyte.

FIG. 6 is a graph which, based on the examples, illustrates the relationship between the average pore size and the electrostatic capacitance (where the electrostatic capacitance of Comparative Example 5 is deemed to be 100), in the case of an organic electrolyte, for core-shell composites of the present invention composed of a core formed from nanoporous carbon and a shell formed from polyaniline.

Based on FIG. 6, it is evident that in the case of an organic electrolyte, a particularly large electrostatic capacitance improvement effect is obtained when the average pore size is at least 1.5 nm but not more than 3 nm. It is thought that the fact that the range of average pore sizes at which a particularly large increase in the electrostatic capacitance is observed has shifted to a larger size compared with the case of an aqueous solution electrolyte is an effect of the different electrolyte ion sizes.

DESCRIPTION OF THE REFERENCE SIGNS

10: Core-shell composite
11: Core
11*a*: Pore
12: Shell layer
12*a*: Conductive polymer nanorod
20: Secondary battery
30: Case
31: Positive electrode can
32: Negative electrode can
33: Space
34: Gasket
40: Electrode layer
41: Positive electrode
42: Negative electrode
50: Electrode layer
51: Cathode
52: Anode
53: Electrolyte
54, 56: Current collector
55, 57: Active material layer

The invention claimed is:

1. A core-shell composite comprising a core formed from a carbon porous body having a large number of pores from an interior through to a surface, and a shell layer formed from conductive polymer nanorods that extend outward from cavities of pores on a surface of the core,
   wherein the conductive polymer nanorods narrow with increasing distance from the pores.

2. The core-shell composite according to claim 1, wherein the adjacent conductive polymer nanorods extend independently.

3. The core-shell composite according to claim 1, wherein a length that the conductive polymer nanorods extend from the pores is at least 1 nm but not more than 100 nm.

4. The core-shell composite according to claim 1, wherein the carbon porous body is a nanoporous carbon, and an average pore size of the pores of the nanoporous carbon, obtained by a pore distribution analysis performed using non-localized density functional theory, is at least 1.0 nm but not more than 3.0 nm.

5. The core-shell composite according to claim 4, wherein a specific surface area of the nanoporous carbon obtained by a nitrogen BET method is 1,000 $m^2/g$ or more.

6. The core-shell composite according to claim 4, wherein the nanoporous carbon has, within a pore distribution curve determined from a nitrogen adsorption isotherm using non-localized density functional theory, a peak within a range of pore sizes from at least 0.4 nm to not more than 4.2 nm, and a full width at half maximum centered on said peak is at least 0.5 nm but not more than 1.2 nm.

7. The core-shell composite according to claim 1, wherein the carbon porous body has a polyhedral structure having a crystal structure.

8. The core-shell composite according to claim 1, wherein the conductive polymer nanorods are conical.

9. The core-shell composite according to claim 1, wherein the conductive polymer is at least one type of compound selected from the group consisting of aliphatic conjugated system compounds, aromatic conjugated system compounds, heterocyclic conjugated system compounds, hetero atom-containing conjugated system compounds, double-stranded conjugated system compounds and mixed-type conjugated system compounds.

10. An electrode material comprising the core-shell composite according to claim 1.

11. An electrode comprising the electrode material according to claim 10.

12. A secondary battery comprising the electrode according to claim 11.

13. An electric double-layer capacitor comprising the electrode according to claim 11.

14. A catalyst comprising the core-shell composite according to claim 1.

15. A method for producing a core-shell composite according to claim 1, the method having a shell layer formation step of adding a carbon porous body to a mixed solution formed from an alcohol solution containing a strong acid and a conductive polymer or a monomer thereof, and a solution containing a strong acid and ammonium persulfate, thereby forming a shell layer formed from the conductive polymer or the monomer thereof on a surface of the carbon porous body.

16. The method for producing a core-shell composite according to claim 15, wherein the conductive polymer or the monomer thereof is at least one type of compound selected from the group consisting of aliphatic conjugated system compounds, aromatic conjugated system compounds, heterocyclic conjugated system compounds, hetero atom-containing conjugated system compounds, double-stranded conjugated system compounds and mixed-type conjugated system compounds.

\* \* \* \* \*